United States Patent
Li

(10) Patent No.: US 11,354,233 B2
(45) Date of Patent: Jun. 7, 2022

(54) METHOD AND SYSTEM FOR FACILITATING FAST CRASH RECOVERY IN A STORAGE DEVICE

(71) Applicant: Alibaba Group Holding Limited, Grand Cayman (KY)

(72) Inventor: Shu Li, Bothell, WA (US)

(73) Assignee: Alibaba Group Holding Limited, George Town (KY)

( * ) Notice: Subject to any disclaimer, the term of this patent is extended or adjusted under 35 U.S.C. 154(b) by 1 day.

(21) Appl. No.: 16/939,961

(22) Filed: Jul. 27, 2020

(65) Prior Publication Data
US 2022/0027265 A1 Jan. 27, 2022

(51) Int. Cl.
*G06F 12/0873* (2016.01)
*G06F 12/02* (2006.01)
(Continued)

(52) U.S. Cl.
CPC ...... *G06F 12/0246* (2013.01); *G06F 9/45558* (2013.01); *G06F 9/546* (2013.01);
(Continued)

(58) Field of Classification Search
CPC .................. G06F 12/0246; G06F 2212/7201
See application file for complete search history.

(56) References Cited

U.S. PATENT DOCUMENTS 3,893,071 A 7/1975 Bossen
4,562,494 A 12/1985 Bond
(Continued)

FOREIGN PATENT DOCUMENTS

JP 2003022209 1/2003
JP 2011175422 9/2011
(Continued)

OTHER PUBLICATIONS

C. Wu, D. Wu, H. Chou and C. Cheng, "Rethink the Design of Flash Translation Layers in a Component-Based View", in IEEE Acess, vol. 5, pp. 12895-12912, 2017.
(Continued)

*Primary Examiner* — Edward J Dudek, Jr.
(74) *Attorney, Agent, or Firm* — Shun Yao; Yao Legal Services, Inc.

(57) ABSTRACT

A system is provided for facilitating crash recovery. The system receives an input/output (I/O) request for data associated with a logical block address. The system retrieves, from a first mapping table associated with a first storage drive, a physical location corresponding to the logical block address, wherein the first mapping table is stored in a random access memory which comprises a block device, and wherein a driver for the block device is stored in system memory separately from the first mapping table stored in the block device. The system accesses the physical location to execute the I/O request. Responsive to determining a crash associated with the driver, the system restarts the driver to recover access to the first mapping table absent of reconstruction of the first mapping table which involves reading data from the first storage drive and extracting mapping relations between logical addresses and physical addresses.

21 Claims, 10 Drawing Sheets

(51) Int. Cl.
   *G06F 12/0862*   (2016.01)
   *G06F 9/455*     (2018.01)
   *G06F 9/54*      (2006.01)

(52) U.S. Cl.
   CPC ...... *G06F 12/0862* (2013.01); *G06F 12/0873* (2013.01); *G06F 2009/45579* (2013.01); *G06F 2212/7201* (2013.01)

(56) References Cited

U.S. PATENT DOCUMENTS

| | | |
|---|---|---|
| 4,718,067 A | 1/1988 | Peters |
| 4,775,932 A | 10/1988 | Oxley |
| 4,858,040 A | 8/1989 | Hazebrouck |
| 5,394,382 A | 2/1995 | Hu |
| 5,602,693 A | 2/1997 | Brunnett |
| 5,715,471 A | 2/1998 | Otsuka |
| 5,732,093 A | 3/1998 | Huang |
| 5,802,551 A | 9/1998 | Komatsu |
| 5,930,167 A | 7/1999 | Lee |
| 6,098,185 A | 8/2000 | Wilson |
| 6,148,377 A | 11/2000 | Carter |
| 6,226,650 B1 | 5/2001 | Mahajan et al. |
| 6,243,795 B1 | 6/2001 | Yang |
| 6,457,104 B1 | 9/2002 | Tremaine |
| 6,658,478 B1 | 12/2003 | Singhal |
| 6,795,894 B1 | 9/2004 | Neufeld |
| 7,351,072 B2 | 4/2008 | Muff |
| 7,565,454 B2 | 7/2009 | Zuberi |
| 7,599,139 B1 | 10/2009 | Bombet |
| 7,953,899 B1 | 5/2011 | Hooper |
| 7,958,433 B1 | 6/2011 | Yoon |
| 8,085,569 B2 | 12/2011 | Kim |
| 8,144,512 B2 | 3/2012 | Huang |
| 8,166,233 B2 | 4/2012 | Schibilla |
| 8,260,924 B2 | 9/2012 | Koretz |
| 8,281,061 B2 | 10/2012 | Radke |
| 8,452,819 B1 | 5/2013 | Sorenson, III |
| 8,516,284 B2 | 8/2013 | Chan |
| 8,527,544 B1 | 9/2013 | Colgrove |
| 8,751,763 B1 | 6/2014 | Ramarao |
| 8,819,367 B1 | 8/2014 | Fallone |
| 8,825,937 B2 | 9/2014 | Atkisson |
| 8,832,688 B2 | 9/2014 | Tang |
| 8,868,825 B1 | 10/2014 | Hayes |
| 8,904,061 B1 | 12/2014 | O'Brien, III |
| 8,949,208 B1 | 2/2015 | Xu |
| 9,015,561 B1 | 4/2015 | Hu |
| 9,031,296 B2 | 5/2015 | Kaempfer |
| 9,043,545 B2 | 5/2015 | Kimmel |
| 9,088,300 B1 | 7/2015 | Chen |
| 9,092,223 B1 | 7/2015 | Pani |
| 9,129,628 B1 | 9/2015 | Fallone |
| 9,141,176 B1 | 9/2015 | Chen |
| 9,208,817 B1 | 12/2015 | Li |
| 9,213,627 B2 | 12/2015 | Van Acht |
| 9,280,472 B1 | 3/2016 | Dang |
| 9,280,487 B2 | 3/2016 | Candelaria |
| 9,311,939 B1 | 4/2016 | Malina |
| 9,336,340 B1 | 5/2016 | Dong |
| 9,436,595 B1 | 9/2016 | Benitez |
| 9,495,263 B2 | 11/2016 | Pang |
| 9,529,601 B1 | 12/2016 | Dharmadhikari |
| 9,529,670 B2 | 12/2016 | O'Connor |
| 9,575,982 B1 | 2/2017 | Sankara Subramanian |
| 9,588,698 B1 | 3/2017 | Karamcheti |
| 9,588,977 B1 | 3/2017 | Wang |
| 9,607,631 B2 | 3/2017 | Rausch |
| 9,671,971 B2 | 6/2017 | Trika |
| 9,747,202 B1 | 8/2017 | Shaharabany |
| 9,852,076 B1 | 12/2017 | Garg |
| 9,875,053 B2 | 1/2018 | Frid |
| 9,912,530 B2 | 3/2018 | Singatwaria |
| 9,946,596 B2 | 4/2018 | Hashimoto |
| 10,013,169 B2 | 7/2018 | Fisher |
| 10,199,066 B1 | 2/2019 | Feldman |
| 10,229,735 B1 | 3/2019 | Natarajan |
| 10,235,198 B2 | 3/2019 | Qiu |
| 10,268,390 B2 | 4/2019 | Warfield |
| 10,318,467 B2 | 6/2019 | Barzik |
| 10,361,722 B2 | 7/2019 | Lee |
| 10,437,670 B1 | 10/2019 | Koltsidas |
| 10,459,663 B2 | 10/2019 | Agombar |
| 10,642,522 B2 | 5/2020 | Li |
| 10,649,657 B2 | 5/2020 | Zaidman |
| 10,678,432 B1 | 6/2020 | Dreier |
| 10,756,816 B1 | 8/2020 | Dreier |
| 10,928,847 B2 | 2/2021 | Suresh |
| 2001/0032324 A1 | 10/2001 | Slaughter |
| 2002/0010783 A1 | 1/2002 | Primak |
| 2002/0039260 A1 | 4/2002 | Kilmer |
| 2002/0073358 A1 | 6/2002 | Atkinson |
| 2002/0095403 A1 | 7/2002 | Chandrasekaran |
| 2002/0112085 A1 | 8/2002 | Berg |
| 2002/0161890 A1 | 10/2002 | Chen |
| 2003/0074319 A1 | 4/2003 | Jaquette |
| 2003/0145274 A1 | 7/2003 | Hwang |
| 2003/0163594 A1 | 8/2003 | Aasheim |
| 2003/0163633 A1 | 8/2003 | Aasheim |
| 2003/0217080 A1 | 11/2003 | White |
| 2004/0010545 A1 | 1/2004 | Pandya |
| 2004/0066741 A1 | 4/2004 | Dinker |
| 2004/0103238 A1 | 5/2004 | Avraham |
| 2004/0143718 A1 | 7/2004 | Chen |
| 2004/0255171 A1 | 12/2004 | Zimmer |
| 2004/0267752 A1 | 12/2004 | Wong |
| 2004/0268278 A1 | 12/2004 | Hoberman |
| 2005/0038954 A1 | 2/2005 | Saliba |
| 2005/0097126 A1 | 5/2005 | Cabrera |
| 2005/0138325 A1 | 6/2005 | Hofstee |
| 2005/0144358 A1 | 6/2005 | Conley |
| 2005/0149827 A1 | 7/2005 | Lambert |
| 2005/0174670 A1 | 8/2005 | Dunn |
| 2005/0177672 A1 | 8/2005 | Rao |
| 2005/0177755 A1 | 8/2005 | Fung |
| 2005/0195635 A1 | 9/2005 | Conley |
| 2005/0235067 A1 | 10/2005 | Creta |
| 2005/0235171 A1 | 10/2005 | Igari |
| 2006/0031709 A1 | 2/2006 | Hiraiwa |
| 2006/0101197 A1 | 5/2006 | Georgis |
| 2006/0156012 A1 | 7/2006 | Beeson |
| 2006/0184813 A1 | 8/2006 | Bui |
| 2007/0033323 A1 | 2/2007 | Gorobets |
| 2007/0061502 A1 | 3/2007 | Lasser |
| 2007/0101096 A1 | 5/2007 | Gorobets |
| 2007/0250756 A1 | 10/2007 | Gower |
| 2007/0266011 A1 | 11/2007 | Rohrs |
| 2007/0283081 A1 | 12/2007 | Lasser |
| 2007/0283104 A1 | 12/2007 | Wellwood |
| 2007/0285980 A1 | 12/2007 | Shimizu |
| 2008/0034154 A1 | 2/2008 | Lee |
| 2008/0065805 A1 | 3/2008 | Wu |
| 2008/0082731 A1 | 4/2008 | Karamcheti |
| 2008/0112238 A1 | 5/2008 | Kim |
| 2008/0163033 A1 | 7/2008 | Yim |
| 2008/0301532 A1 | 12/2008 | Uchikawa |
| 2009/0006667 A1 | 1/2009 | Lin |
| 2009/0089544 A1 | 4/2009 | Liu |
| 2009/0113219 A1 | 4/2009 | Aharonov |
| 2009/0125788 A1 | 5/2009 | Wheeler |
| 2009/0183052 A1 | 7/2009 | Kanno |
| 2009/0254705 A1 | 10/2009 | Abali |
| 2009/0282275 A1 | 11/2009 | Yermalayeu |
| 2009/0287956 A1 | 11/2009 | Flynn |
| 2009/0307249 A1 | 12/2009 | Koifman |
| 2009/0307426 A1 | 12/2009 | Galloway |
| 2009/0310412 A1 | 12/2009 | Jang |
| 2010/0031000 A1 | 2/2010 | Flynn |
| 2010/0169470 A1 | 7/2010 | Takashige |
| 2010/0217952 A1 | 8/2010 | Iyer |
| 2010/0229224 A1 | 9/2010 | Etchegoyen |
| 2010/0241848 A1 | 9/2010 | Smith |
| 2010/0321999 A1 | 12/2010 | Yoo |
| 2010/0325367 A1 | 12/2010 | Kornegay |

(56) References Cited

U.S. PATENT DOCUMENTS

| | | |
|---|---|---|
| 2010/0332922 A1 | 12/2010 | Chang |
| 2011/0031546 A1 | 2/2011 | Uenaka |
| 2011/0055458 A1 | 3/2011 | Kuehne |
| 2011/0055471 A1 | 3/2011 | Thatcher |
| 2011/0060722 A1 | 3/2011 | Li |
| 2011/0072204 A1 | 3/2011 | Chang |
| 2011/0099418 A1 | 4/2011 | Chen |
| 2011/0153903 A1 | 6/2011 | Hinkle |
| 2011/0161784 A1 | 6/2011 | Selinger |
| 2011/0191525 A1 | 8/2011 | Hsu |
| 2011/0218969 A1 | 9/2011 | Anglin |
| 2011/0231598 A1 | 9/2011 | Hatsuda |
| 2011/0239083 A1 | 9/2011 | Kanno |
| 2011/0252188 A1 | 10/2011 | Weingarten |
| 2011/0258514 A1 | 10/2011 | Lasser |
| 2011/0289263 A1 | 11/2011 | McWilliams |
| 2011/0289280 A1 | 11/2011 | Koseki |
| 2011/0292538 A1 | 12/2011 | Haga |
| 2011/0296411 A1 | 12/2011 | Tang |
| 2011/0299317 A1 | 12/2011 | Shaeffer |
| 2011/0302353 A1 | 12/2011 | Confalonieri |
| 2012/0017037 A1 | 1/2012 | Riddle |
| 2012/0039117 A1 | 2/2012 | Webb |
| 2012/0084523 A1 | 4/2012 | Littlefield |
| 2012/0089774 A1 | 4/2012 | Kelkar |
| 2012/0096330 A1 | 4/2012 | Przybylski |
| 2012/0117399 A1 | 5/2012 | Chan |
| 2012/0147021 A1 | 6/2012 | Cheng |
| 2012/0151253 A1 | 6/2012 | Horn |
| 2012/0159099 A1 | 6/2012 | Lindamood |
| 2012/0159289 A1 | 6/2012 | Piccirillo |
| 2012/0173792 A1 | 7/2012 | Lassa |
| 2012/0203958 A1 | 8/2012 | Jones |
| 2012/0210095 A1 | 8/2012 | Nellans |
| 2012/0233523 A1 | 9/2012 | Krishnamoorthy |
| 2012/0246392 A1 | 9/2012 | Cheon |
| 2012/0278579 A1 | 11/2012 | Goss |
| 2012/0284587 A1 | 11/2012 | Yu |
| 2012/0324312 A1 | 12/2012 | Moyer |
| 2012/0331207 A1 | 12/2012 | Lassa |
| 2013/0013880 A1 | 1/2013 | Tashiro |
| 2013/0016970 A1 | 1/2013 | Koka |
| 2013/0018852 A1 | 1/2013 | Barton |
| 2013/0024605 A1 | 1/2013 | Sharon |
| 2013/0054822 A1 | 2/2013 | Mordani |
| 2013/0061029 A1 | 3/2013 | Huff |
| 2013/0073798 A1 | 3/2013 | Kang |
| 2013/0080391 A1 | 3/2013 | Raichstein |
| 2013/0145085 A1 | 6/2013 | Yu |
| 2013/0145089 A1 | 6/2013 | Eleftheriou |
| 2013/0151759 A1 | 6/2013 | Shim |
| 2013/0159251 A1 | 6/2013 | Skrenta |
| 2013/0159723 A1 | 6/2013 | Brandt |
| 2013/0166820 A1 | 6/2013 | Batwara |
| 2013/0173845 A1 | 7/2013 | Aslam |
| 2013/0191601 A1 | 7/2013 | Peterson |
| 2013/0205183 A1 | 8/2013 | Fillingim |
| 2013/0219131 A1 | 8/2013 | Alexandron |
| 2013/0227347 A1 | 8/2013 | Cho |
| 2013/0238955 A1 | 9/2013 | D Abreu |
| 2013/0254622 A1 | 9/2013 | Kanno |
| 2013/0318283 A1 | 11/2013 | Small |
| 2013/0318395 A1 | 11/2013 | Kalavade |
| 2013/0329492 A1 | 12/2013 | Yang |
| 2014/0006688 A1 | 1/2014 | Yu |
| 2014/0019650 A1 | 1/2014 | Li |
| 2014/0025638 A1 | 1/2014 | Hu |
| 2014/0082273 A1 | 3/2014 | Segev |
| 2014/0082412 A1 | 3/2014 | Matsumura |
| 2014/0095769 A1 | 4/2014 | Borkenhagen |
| 2014/0095827 A1 | 4/2014 | Wei |
| 2014/0108414 A1 | 4/2014 | Stillerman |
| 2014/0108891 A1 | 4/2014 | Strasser |
| 2014/0164447 A1 | 6/2014 | Tarafdar |
| 2014/0164879 A1 | 6/2014 | Tam |
| 2014/0181532 A1 | 6/2014 | Camp |
| 2014/0195564 A1 | 7/2014 | Talagala |
| 2014/0215129 A1 | 7/2014 | Kuzmin |
| 2014/0223079 A1 | 8/2014 | Zhang |
| 2014/0233950 A1 | 8/2014 | Luo |
| 2014/0250259 A1 | 9/2014 | Ke |
| 2014/0279927 A1 | 9/2014 | Constantinescu |
| 2014/0304452 A1 | 10/2014 | De La Iglesia |
| 2014/0310574 A1 | 10/2014 | Yu |
| 2014/0359229 A1 | 12/2014 | Cota-Robles |
| 2014/0365707 A1 | 12/2014 | Talagala |
| 2015/0019798 A1 | 1/2015 | Huang |
| 2015/0082317 A1 | 3/2015 | You |
| 2015/0106556 A1 | 4/2015 | Yu |
| 2015/0106559 A1 | 4/2015 | Cho |
| 2015/0121031 A1 | 4/2015 | Feng |
| 2015/0142752 A1 | 5/2015 | Chennamsetty |
| 2015/0143030 A1 | 5/2015 | Gorobets |
| 2015/0199234 A1 | 7/2015 | Choi |
| 2015/0227316 A1 | 8/2015 | Warfield |
| 2015/0234845 A1 | 8/2015 | Moore |
| 2015/0269964 A1 | 9/2015 | Fallone |
| 2015/0277937 A1 | 10/2015 | Swanson |
| 2015/0286477 A1 | 10/2015 | Mathur |
| 2015/0294684 A1 | 10/2015 | Qjang |
| 2015/0301964 A1 | 10/2015 | Brinicombe |
| 2015/0304108 A1 | 10/2015 | Obukhov |
| 2015/0310916 A1 | 10/2015 | Leem |
| 2015/0317095 A1 | 11/2015 | Voigt |
| 2015/0341123 A1 | 11/2015 | Nagarajan |
| 2015/0347025 A1 | 12/2015 | Law |
| 2015/0363271 A1 | 12/2015 | Haustein |
| 2015/0363328 A1 | 12/2015 | Candelaria |
| 2015/0372597 A1 | 12/2015 | Luo |
| 2016/0014039 A1 | 1/2016 | Reddy |
| 2016/0026575 A1 | 1/2016 | Samanta |
| 2016/0041760 A1 | 2/2016 | Kuang |
| 2016/0048327 A1 | 2/2016 | Jayasena |
| 2016/0048341 A1 | 2/2016 | Constantinescu |
| 2016/0054922 A1 | 2/2016 | Awasthi |
| 2016/0062885 A1 | 3/2016 | Ryu |
| 2016/0077749 A1 | 3/2016 | Ravimohan |
| 2016/0077764 A1 | 3/2016 | Ori |
| 2016/0077968 A1 | 3/2016 | Sela |
| 2016/0098344 A1 | 4/2016 | Gorobets |
| 2016/0098350 A1 | 4/2016 | Tang |
| 2016/0103631 A1 | 4/2016 | Ke |
| 2016/0110254 A1 | 4/2016 | Cronie |
| 2016/0132237 A1 | 5/2016 | Jeong |
| 2016/0154601 A1 | 6/2016 | Chen |
| 2016/0155750 A1 | 6/2016 | Yasuda |
| 2016/0162187 A1 | 6/2016 | Lee |
| 2016/0179399 A1 | 6/2016 | Melik-Martirosian |
| 2016/0188223 A1 | 6/2016 | Camp |
| 2016/0188890 A1 | 6/2016 | Naeimi |
| 2016/0203000 A1 | 7/2016 | Parmar |
| 2016/0224267 A1 | 8/2016 | Yang |
| 2016/0232103 A1 | 8/2016 | Schmisseur |
| 2016/0234297 A1 | 8/2016 | Ambach |
| 2016/0239074 A1 | 8/2016 | Lee |
| 2016/0239380 A1 | 8/2016 | Wideman |
| 2016/0274636 A1 | 9/2016 | Kim |
| 2016/0306699 A1 | 10/2016 | Resch |
| 2016/0306853 A1 | 10/2016 | Sabaa |
| 2016/0321002 A1 | 11/2016 | Jung |
| 2016/0335085 A1 | 11/2016 | Scalabrino |
| 2016/0342345 A1 | 11/2016 | Kankani |
| 2016/0343429 A1 | 11/2016 | Nieuwejaar |
| 2016/0350002 A1 | 12/2016 | Vergis |
| 2016/0350385 A1 | 12/2016 | Poder |
| 2016/0364146 A1 | 12/2016 | Kuttner |
| 2016/0381442 A1 | 12/2016 | Heanue |
| 2017/0004037 A1 | 1/2017 | Park |
| 2017/0010652 A1 | 1/2017 | Huang |
| 2017/0075583 A1 | 3/2017 | Alexander |
| 2017/0075594 A1 | 3/2017 | Badam |
| 2017/0091110 A1 | 3/2017 | Ash |
| 2017/0109199 A1 | 4/2017 | Chen |
| 2017/0109232 A1 | 4/2017 | Cha |

(56) References Cited

U.S. PATENT DOCUMENTS

| | | |
|---|---|---|
| 2017/0123655 A1 | 5/2017 | Sinclair |
| 2017/0147499 A1 | 5/2017 | Mohan |
| 2017/0161202 A1 | 6/2017 | Erez |
| 2017/0162235 A1 | 6/2017 | De |
| 2017/0168986 A1 | 6/2017 | Sajeepa |
| 2017/0177217 A1 | 6/2017 | Kanno |
| 2017/0177259 A1 | 6/2017 | Motwani |
| 2017/0185498 A1 | 6/2017 | Gao |
| 2017/0192848 A1 | 7/2017 | Pamies-Juarez |
| 2017/0199823 A1 | 7/2017 | Hayes |
| 2017/0212708 A1 | 7/2017 | Suhas |
| 2017/0220254 A1 | 8/2017 | Warfield |
| 2017/0221519 A1 | 8/2017 | Matsuo |
| 2017/0228157 A1 | 8/2017 | Yang |
| 2017/0242722 A1 | 8/2017 | Qiu |
| 2017/0249162 A1 | 8/2017 | Tsirkin |
| 2017/0262176 A1 | 9/2017 | Kanno |
| 2017/0262178 A1 | 9/2017 | Hashimoto |
| 2017/0262217 A1 | 9/2017 | Pradhan |
| 2017/0269998 A1 | 9/2017 | Sunwoo |
| 2017/0279460 A1 | 9/2017 | Camp |
| 2017/0285976 A1 | 10/2017 | Durham |
| 2017/0286311 A1 | 10/2017 | Juenemann |
| 2017/0322888 A1 | 11/2017 | Booth |
| 2017/0344470 A1 | 11/2017 | Yang |
| 2017/0344491 A1 | 11/2017 | Pandurangan |
| 2017/0353576 A1 | 12/2017 | Guim Bernat |
| 2018/0024772 A1 | 1/2018 | Madraswala |
| 2018/0024779 A1 | 1/2018 | Kojima |
| 2018/0033491 A1 | 2/2018 | Marelli |
| 2018/0052797 A1 | 2/2018 | Barzik |
| 2018/0067847 A1 | 3/2018 | Oh |
| 2018/0069658 A1 | 3/2018 | Benisty |
| 2018/0074730 A1 | 3/2018 | Inoue |
| 2018/0076828 A1 | 3/2018 | Kanno |
| 2018/0088867 A1 | 3/2018 | Kaminaga |
| 2018/0107591 A1 | 4/2018 | Smith |
| 2018/0113631 A1 | 4/2018 | Zhang |
| 2018/0143780 A1 | 5/2018 | Cho |
| 2018/0150640 A1 | 5/2018 | Li |
| 2018/0165038 A1 | 6/2018 | Authement |
| 2018/0165169 A1 | 6/2018 | Camp |
| 2018/0165340 A1 | 6/2018 | Agarwal |
| 2018/0167268 A1 | 6/2018 | Liguori |
| 2018/0173620 A1 | 6/2018 | Cen |
| 2018/0188970 A1 | 7/2018 | Liu |
| 2018/0189175 A1 | 7/2018 | Ji |
| 2018/0189182 A1 | 7/2018 | Wang |
| 2018/0212951 A1 | 7/2018 | Goodrum |
| 2018/0219561 A1 | 8/2018 | Litsyn |
| 2018/0226124 A1 | 8/2018 | Perner |
| 2018/0232151 A1 | 8/2018 | Badam |
| 2018/0260148 A1* | 9/2018 | Klein .................. G06F 3/0688 |
| 2018/0270110 A1 | 9/2018 | Chugtu |
| 2018/0293014 A1 | 10/2018 | Ravimohan |
| 2018/0300203 A1 | 10/2018 | Kathpal |
| 2018/0321864 A1 | 11/2018 | Benisty |
| 2018/0322024 A1 | 11/2018 | Nagao |
| 2018/0329776 A1 | 11/2018 | Lai |
| 2018/0336921 A1 | 11/2018 | Ryun |
| 2018/0349396 A1 | 12/2018 | Filip |
| 2018/0356992 A1 | 12/2018 | Lamberts |
| 2018/0357126 A1 | 12/2018 | Dhuse |
| 2018/0373428 A1 | 12/2018 | Kan |
| 2018/0373655 A1 | 12/2018 | Liu |
| 2018/0373664 A1 | 12/2018 | Vijayrao |
| 2019/0012111 A1 | 1/2019 | Li |
| 2019/0050327 A1 | 2/2019 | Li |
| 2019/0065085 A1 | 2/2019 | Jean |
| 2019/0073261 A1 | 3/2019 | Halbert |
| 2019/0073262 A1 | 3/2019 | Chen |
| 2019/0087089 A1 | 3/2019 | Yoshida |
| 2019/0087115 A1 | 3/2019 | Li |
| 2019/0087328 A1 | 3/2019 | Kanno |
| 2019/0116127 A1 | 4/2019 | Pismenny |
| 2019/0171532 A1 | 6/2019 | Abadi |
| 2019/0172820 A1 | 6/2019 | Meyers |
| 2019/0196748 A1* | 6/2019 | Badam .................. G06F 3/0688 |
| 2019/0196907 A1 | 6/2019 | Khan |
| 2019/0205206 A1 | 7/2019 | Hornung |
| 2019/0212949 A1 | 7/2019 | Pletka |
| 2019/0220392 A1 | 7/2019 | Lin |
| 2019/0227927 A1 | 7/2019 | Miao |
| 2019/0272242 A1 | 9/2019 | Kachare |
| 2019/0278654 A1 | 9/2019 | Kaynak |
| 2019/0317901 A1 | 10/2019 | Kachare |
| 2019/0339998 A1 | 11/2019 | Momchilov |
| 2019/0377632 A1 | 12/2019 | Oh |
| 2019/0377821 A1 | 12/2019 | Pleshachkov |
| 2019/0391748 A1 | 12/2019 | Li |
| 2020/0004456 A1 | 1/2020 | Williams |
| 2020/0004674 A1 | 1/2020 | Williams |
| 2020/0013458 A1 | 1/2020 | Schreck |
| 2020/0042223 A1 | 2/2020 | Li |
| 2020/0042387 A1 | 2/2020 | Shani |
| 2020/0089430 A1 | 3/2020 | Kanno |
| 2020/0097189 A1 | 3/2020 | Tao |
| 2020/0143885 A1 | 5/2020 | Kim |
| 2020/0159425 A1 | 5/2020 | Flynn |
| 2020/0167091 A1 | 5/2020 | Haridas |
| 2020/0225875 A1* | 7/2020 | Oh ........................ G06F 9/52 |
| 2020/0242021 A1* | 7/2020 | Gholamipour ...... G06F 12/0804 |
| 2020/0250032 A1 | 8/2020 | Goyal |
| 2020/0257598 A1 | 8/2020 | Yazovitsky |
| 2020/0326855 A1 | 10/2020 | Wu |
| 2020/0328192 A1 | 10/2020 | Zaman |
| 2020/0348888 A1 | 11/2020 | Kim |
| 2020/0387327 A1* | 12/2020 | Hsieh ...................... G06F 3/064 |
| 2020/0401334 A1 | 12/2020 | Saxena |
| 2020/0409791 A1 | 12/2020 | Devriendt |
| 2021/0010338 A1 | 1/2021 | Santos |
| 2021/0089392 A1 | 3/2021 | Shirakawa |
| 2021/0103388 A1* | 4/2021 | Choi .................... G06F 3/0631 |

FOREIGN PATENT DOCUMENTS

| | | |
|---|---|---|
| WO | 9418634 | 8/1994 |
| WO | 1994018634 | 8/1994 |

OTHER PUBLICATIONS

Po-Liang Wu, Yuan-Hao Chang and T. Kuo, "A file-system-aware FIL design for flash-memory storage systems," 2009, pp. 393-398.

S. Choudhuri and T. Givargis, "Preformance improvement of block based NAND flash translation layer", 2007 5th IEEE/ACM/IFIP International Conference on Hardware/Software Codesign and Systems Synthesis (CODES+ISSS). Saizburg, 2007, pp. 257-262.

A. Zuck, O. Kishon and S. Toledo. "LSDM: Improving the Preformance of Mobile Storage with a Log-Structured Address Remapping Device Driver", 2014 Eighth International Conference on Next Generation Mobile Apps, Services and Technologies, Oxford, 2014, pp. 221-228.

J. Jung and Y. Won, "nvramdisk: A Transactional Block Device Driver for Non-Volatile RAM", in IEEE Transactions on Computers, vol. 65, No. 2, pp. 589-600, Feb. 1, 2016.

Te I et al. (Pensieve: a Machine Assisted SSD Layer for Extending the Lifetime: (Year: 2018).

ARM ("Cortex-R5 and Cortex-R5F", Technical reference Manual, Revision r1p1) (Year:2011).

https://web.archive.org/web/20071130235034/http://en.wikipedia.org:80/wiki/logical_block_addressing wikipedia screen shot retriefed on wayback Nov. 20, 2007 showing both physical and logical addressing used historically to access data on storage devices (Year: 2007).

Ivan Picoli, Carla Pasco, Bjorn Jonsson, Luc Bouganim, Philippe Bonnet. "uFLIP-OC: Understanding Flash I/O Patterns on Open-Channel Solid-State Drives." APSys'17, Sep. 2017, Mumbai, India, pp. 1-7, 2017, <10.1145/3124680.3124741 >. <hal-01654985>.

EMC Powerpath Load Balancing and Failover Comparison with native MPIO operating system solutions. Feb. 2011.

(56) References Cited

OTHER PUBLICATIONS

Tsuchiya, Yoshihiro et al. "DBLK: Deduplication for Primary Block Storage", MSST 2011, Denver, CO, May 23-27, 2011 pp. 1-5.
Chen Feng, et al. "Caftl: A Content-Aware Flash Translation Layer Enhancing the Lifespan of Flash Memory based Solid State Devices"< FAST'11, San Jose, CA Feb. 15-17, 2011, pp. 1-14.
Wu, Huijun et al. "HPDedup: A Hybrid Prioritized Data Deduplication Mechanism for Primary Storage in the Cloud", Cornell Univ. arXiv: 1702.08153v2[cs.DC], Apr. 16, 2017, pp. 1-14https://www.syncids.com/#.
WOW: Wise Ordering for Writes—Combining Spatial and Temporal Locality in Non-Volatile Caches by Gill (Year: 2005).
Helen H. W. Chan et al. "HashKV: Enabling Efficient Updated in KV Storage via Hashing", https://www.usenix.org/conference/atc18/presentation/chan, (Year: 2018).
S. Hong and D. Shin, "NAND Flash-Based Disk Cache Using SLC/MLC Combined Flash Memory," 2010 International Workshop on Storage Network Architecture and Parallel I/Os, Incline Village, NV, 2010, pp. 21-30.
Arpaci-Dusseau et al. "Operating Systems: Three Easy Pieces", Originally published 2015; Pertinent: Chapter 44; flash-based SSDs, available at http://pages.cs.wisc.edu/~remzi/OSTEP/.
Jimenex, X., Novo, D. and P. lenne, "Pheonix:Reviving MLC Blocks as SLC to Extend NAND Flash Devices Lifetime, "Design, Automation & Text in Europe Conference & Exhibition (DATE), 2013.
Yang, T. Wu, H. and W. Sun, "GD-FTL: Improving the Performance and Lifetime of TLC SSD by Downgrading Worn-out Blocks," IEEE 37th International Performance Computing and Communications Conference (IPCCC), 2018.

\* cited by examiner

METHOD AND SYSTEM FOR FACILITATING FAST CRASH RECOVERY IN A STORAGE DEVICE

BACKGROUND

Field

This disclosure is generally related to the field of data storage. More specifically, this disclosure is related to a method and system for facilitating a fast crash recovery in a storage device.

Related Art

Today, various storage systems are being used to store and access the ever-increasing amount of digital content. A storage system can include various storage devices which can provide persistent memory, e.g., a solid state drive (SSD) and a hard disk drive (HDD). An open-channel SSD is a type of SSD which can provide transparency and flexibility in managing Not-And (NAND) flash memory. In an open-channel SSD, the flash translation layer (FTL), along with an associated mapping table of logical address information to physical address information, resides in the host side (e.g., in the kernel mode or in the user space). This host-based FTL can allow for the sharing of internal SSD information with the software, and can further provide an optimization of FTL operations along with the execution of host applications. This sharing and optimization can result in an improvement in the performance, cost, reliability, and operation of the SSD and the overall storage system.

In a host-based FTL open-channel SSD, the FTL is a program which generally runs in the system memory. The FTL program is responsible for maintaining the mapping table. The FTL program may crash due to various reasons, e.g., memory issues, host crash, etc. In the event that the FTL program crashes, the system can recover the content of the mapping table by reading a large amount of data from the SSD in order to rebuild or reconstruct the mapping table. This recovery process may be time-consuming, and may result in difficulties in ensuring service recovery in a time sufficient to meet the requirements of a service level agreement (SLA).

Thus, while the host-based FTL can provide transparency and flexibility in managing the physical media of a storage drive, some challenges exist when handling an FTL program crash which results in the time-consuming process of rebuilding the mapping table.

SUMMARY

One embodiment provides a system which facilitates crash recovery. The system receives an input/output (I/O) request for data associated with a logical block address. The system retrieves, from a first mapping table associated with a first storage drive, a physical location corresponding to the logical block address, wherein the first mapping table is stored in a random access memory which comprises a block device, and wherein a driver for the block device is stored in system memory separately from the first mapping table stored in the block device. The system accesses the physical location to execute the I/O request.

In some embodiments, the system determines, for each of a plurality of storage drives, a size of a mapping table associated with a respective storage drive, wherein the storage drives include the first storage drive, and wherein the size of the mapping table is based on a capacity of the associated respective storage drive. The system appends, based on a sequenced order of the storage drives, a plurality of mapping tables associated with the plurality of storage drives to obtain a mapping file, wherein the mapping file includes the first mapping table. The system stores the mapping file in the block device.

In some embodiments, the I/O request for data is associated with one or more logical block addresses which include the logical block address. The system retrieves the physical location corresponding to the one or more logical block addresses by the following operations. The system identifies the first mapping table associated with the first storage drive. The system identifies a first starting point of the first mapping table based on a summation of the sizes of mapping tables associated with storage drives in the sequenced order which precede the first storage drive. The system determines a first offset based on a value of a first logical block address of the one or more logical block addresses. The system determines a first length associated with the one or more logical block addresses. Each logical block address in a respective mapping table corresponds to metadata of a same size. The first mapping table includes logical block addresses which are sequentially ordered based on values of the included logical block addresses. Accessing the physical location to execute the I/O request is based on accessing the first storage drive at the first starting point plus the first offset for a number of units equal to the first length.

In some embodiments, the first length is equal to a number of the one or more logical block addresses scaled by a predetermined size for metadata stored in the first mapping table.

In some embodiments, a content management module communicates with the driver and the block device to manage the appended mapping tables of the mapping file. The content management module comprises a granularity modulator, an access pattern analyzer, a random engine, and a sequential engine.

In some embodiments, the system determines, by the access pattern analyzer, an access pattern for the requested I/O data. The system adjusts, by the granularity modulator, a size of a unit to access. The system determines whether the I/O request is associated with a random read/write operation or a sequential read/write operation.

In some embodiments, responsive to determining a random read or write operation, the system accesses, by the random engine, the mapping file of the block device with a granularity of a first size, wherein the random engine includes a read cache. Responsive to determining a sequential read or write operation, the system accesses, by the sequential engine, the mapping file of the block device with a granularity of a second size which is greater than the first size. The second size is determined based on a prediction of how much data to pre-fetch from the mapping file of the block device.

In some embodiments, the driver communicates with the block device and the storage drives. An application communicates with the driver based on one or more of: a communication between the application and the driver; and a communication between the application and the driver via a hypervisor. The hypervisor communicates with the driver based on one or more of: a communication between the hypervisor and the driver; and a communication between the hypervisor and the driver via a distributed file system.

In some embodiments, responsive to determining a crash associated with the driver for the block device, the system restarts the driver to recover access to the first mapping table absent of reconstruction of the first mapping table which involves reading data from the first storage drive and extracting mapping relations between logical addresses and physical addresses. A flash translation layer program running in the driver manages the first mapping table. Determining the crash associated with the driver comprises determining a crash associated with the flash translation layer program. Restarting the driver comprises relaunching the flash translation layer program to recover access to the first mapping table.

In another embodiment, the system determines a first mapping table associated with a first storage drive, wherein the first mapping table is stored in a random access memory (RAM) which comprises a block device, and wherein a driver for the block device is stored in system memory separately from the first mapping table stored in the block device. Responsive to determining a crash associated with the driver for the block device, the system restarts the driver to recover access to the first mapping table absent of reconstruction of the first mapping table which involves reading data from the first storage drive and extracting mapping relations between logical addresses and physical addresses.

BRIEF DESCRIPTION OF THE FIGURES

In the figures, like reference numerals refer to the same figure elements.

DETAILED DESCRIPTION

Figure 1:
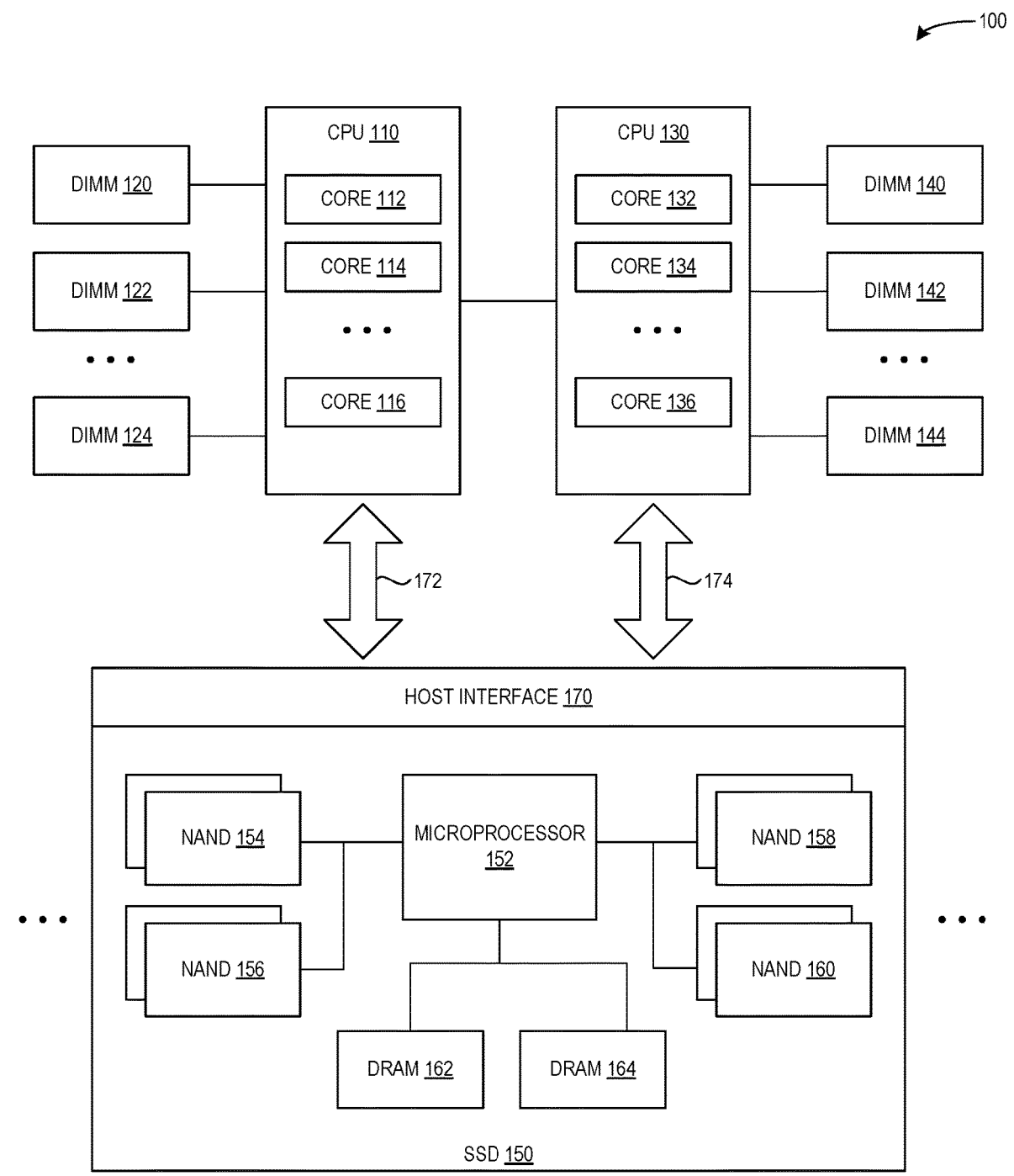
FIG. 1 illustrates an architecture of an exemplary environment for data storage, in accordance with the prior art.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the embodiments described herein are not limited to the embodiments shown, but are to be accorded the widest scope consistent with the principles and features disclosed herein.

Overview

The embodiments described herein provide a system which places the FTL mapping file (as a plurality of appended mapping tables corresponding to a plurality of storage drives) in a random access memory (RAM) disk which comprises a block device, where a driver for the block device is stored in system memory separately from the FTL mapping file or mapping tables, thus avoiding the need to reconstruct the mapping tables by reading data from the storage drives and extracting mapping relations between logical addresses and physical addresses.

As described above, in a host-based FTL (such as an open-channel SSD), the associated mapping table of logical address information to physical address information resides in the host side (e.g., in the kernel mode or in the user space). This host-based FTL can allow for the sharing of internal SSD information with the software, and can further provide an optimization of FTL operations along with the execution of host applications. This sharing and optimization can result in an improvement in the performance, cost, reliability, and operation of the SSD and the overall storage system.

In a host-based FTL open-channel SSD, the FTL is a program which generally runs in the system memory. The FTL program is responsible for maintaining the mapping table. The FTL program may crash due to various reasons, e.g., memory issues, host crash, etc. In the event that the FTL program crashes, the system can recover the content of mapping table by reading a large amount of data from the SSD in order to rebuild or reconstruct the mapping table. This recovery process may be time-consuming, and may result in difficulties in ensuring service recovery in a time sufficient to meet the requirements of a service level agreement (SLA).

Thus, while the host-based FTL can provide transparency and flexibility in managing the physical media of a storage drive, some challenges exist when handling an FTL program crash which results in the time-consuming process of rebuilding the mapping table.

One solution is to provide a device-based FTL, in which the FTL operates as part of an individual or embedded microprocessor and DRAM of a storage device. This device-based FTL can be separate from the host CPU and DRAM, which allows the FTL to remain independent of the applications. If a host application crashes or runs out of order, the FTL is not affected as it is isolated from the host CPU and DRAM. This isolation can thus provide a decoupling of the relationship between the applications and the FTL.

However, as described below in relation to FIG. 1, this solution is limited by several constraints. First, because the FTL operates on the device side, the host lacks visibility to the FTL, which may result in a more difficult management and operation of the physical storage media (e.g., NAND). Second, microprocessors are developing with an increasingly complicated architecture, and in-drive DRAM is developing with an increasingly large capacity. These developments can lead to an increase in the consumption of both power and cost. Third, developing and debugging firmware which is software operating on a microprocessor can be more complicated than on host-side software. Debugging may be particularly difficult due to the limited information which is dumped in the occurrence of accidents. Fourth, if the device-based FTL program itself crashes, the system may need to perform a restart operation, and which can involve the time-consuming process of rebuilding the mapping table (e.g., by reading data from the storage media and extracting the logical to physical mapping relationships).

The embodiments described herein address the challenges associated with both the conventional device-based FTL solution and recovering from a crash in a host-based FTL by placing the FTL mapping information in a RAM disk which is a block device. The block device can store the FTL mapping information, and can be managed or operated by a block device driver (such as an open-channel SSD driver, as described below in relation to FIG. 3). The block device driver can include an FTL driver program. The system can store the FTL mapping information (e.g., mapping tables and files) in the block device separately from the FTL driver program, instead of storing the FTL mapping information together with the FTL driver program in system memory. When the system experiences a crash associated with the block device driver, the system need only restart the driver in order to recover access to the FTL file, as described below in relation to FIG. 4B. This can eliminate or avoid the need to reconstruct the mapping tables by reading data from the storage drives and extracting mapping relations between logical addresses and physical addresses. That is, the recovery process can involve restarting the driver to recover access to the FTL mapping file/tables absent of reconstruction of the FTL mapping file/tables. The block device can store the FTL mapping information, e.g., as a mapping file which includes a plurality of mapping tables corresponding to a plurality of storage drives.

The mapping tables stored in the FTL mapping file in the block device can be appended based on an ordered sequence, as described below in relation to FIG. 5. An I/O request can be a request for data associated with one or more logical block addresses. The data can be accessed by retrieving, from a given mapping table corresponding to a physical storage drive (on which the requested data is stored or to be written to), a physical location associated with the one or more logical block addresses. A first LBA can correspond to a first-occurring LBA of the one or more LBAs based on an ascending order. The physical location can be determined, by: identifying the starting point of the given mapping table (based on sizes of the preceding mapping tables in the ordered sequence of mapping tables in the FTL file); using the value of the first LBA as an index into the given mapping table to determine an offset from the starting point; and determining a length associated with the one or more logical block addresses (based on a fixed size for each LBA entry in the given mapping table). An exemplary communication for accessing information in the mapping tables of the FTL file stored in a block device are described below in relation to FIGS. 3 and 5.

In the embodiments described herein, the system can also include a content management layer which operates between the open-channel SSD driver and the block device. The content management layer can manage the mapping table files, and can also adjust the access granularity (e.g., the I/O size) based on a pattern of access (e.g., an access frequency). The content management layer can perform these functions using a random engine and a sequential engine. An exemplary content management layer is described below in relation to FIG. 5.

Thus, the embodiments described herein provide an improvement to the time-consuming process of rebuilding the mapping table in the event of a crash by placing the FTL file (as an appended plurality of FTL mapping tables corresponding to storage drives in the system) in a RAM disk which is a block device, where an FTL driver program is stored in system memory separately from the FTL file. The system further uses a content management layer to manage and operate the block device based on access granularity. The FTL mapping file is shared between the storage drives and can be accessed based on the ordered sequence of the appended mapping tables as well as an offset and a length associated with one or more logical block addresses of an I/O request.

A "storage system" refers to the overall set of hardware and software components used to facilitate storage for a system. A storage system can include multiple clusters of storage servers and other servers. A "storage server" refers to a computing device which can include multiple storage devices or storage drives. A "storage device" or a "storage drive" refers to a device or a drive with a non-volatile memory which can provide persistent storage of data, e.g., a solid state drive (SSD), a hard disk drive (HDD), or a flash-based storage device.

A "computing device" refers to any server, device, node, entity, drive, or any other entity which can provide any computing capabilities.

A "mapping table" refers to a data structure which maps a logical address to a physical address or a physical location, as described below in relation to FIGS. 3 and 5. An "FTL mapping file" refers to a file or other data structure which includes a plurality of appended mapping tables.

A "block device" or "RAM disk" refers to a random access memory which comprises a block device which is part of system memory. In this disclosure, the FTL mapping file is stored in the block device. Subsequent to a crash associated with a driver which controls, manages, interfaces, or communicates with the block device, the FTL mapping file can be efficiently and quickly accessed after the crash via a system call.

The term "crash recovery" refers to a process by which a driver program returns to a consistent and usable state. In this disclosure, a crash recovery process can include a system call to the FTL mapping file or FTL program running in the block device.

An "open-channel SSD" refers to a storage device which is part of a storage system in which the FTL program does not reside in the storage device (as in a device-based FTL), and instead resides in the host (as in a host-based FTL). In this disclosure, the host-based FTL is managed by a content management layer and the driver of the block device which stores the FTL mapping file.

Architecture of an Exemplary System in the Prior Art

FIG. 1 illustrates an architecture of an exemplary environment 100 for data storage, in accordance with the prior art. Environment 100 can include a host which includes: central processing units (CPUs) 110 and 130. Each CPU can include multiple cores and can be coupled to multiple dual in-line memory modules (DIMMs). For example, CPU 110 can include cores 112, 114, and 116, and can be coupled to DIMMs 120, 122, and 124. Similarly, CPU 130 can include cores 132, 134, and 136, and can be coupled to DIMMs 140, 142, and 144. The host can communicate with a storage device (such as an SSD 150) via a host interface 170 and communication 172 and 174. SSD 150 can also include: a microprocessor 152; DRAMs 162 and 164; and NANDs 154, 156, 158, and 160.

SSD 150 can include an FTL program running on (embedded) microprocessor 152 and stored in DRAMs 162 and 164. In this device-based FTL of environment 100, any issues with host applications generally do not affect the running of the device-based FTL in SSD 150, because the device-based FTL is isolated from the host. While this solution can shield the device-based FTL from suffering due to issues associated with host applications, several limitations remain.

First, because the FTL operates on the device side, the host lacks visibility to the FTL, which may result in a more difficult management and operation of the physical storage media (e.g., NAND). Second, microprocessors are developing with an increasingly complicated architecture, and in-drive DRAM is developing with an increasingly large capacity. These developments can lead to an increase in the consumption of both power and cost. Third, developing and debugging firmware which is software operating on a microprocessor can be more complicated than on host-side software. Debugging may be particularly difficult due to the limited information which is dumped in the occurrence of accidents. Fourth, if the device-based FTL program itself crashes, the system may need to restart, and may need to perform the time-consuming process of rebuilding the mapping table (e.g., by reading data from the storage media and extracting the logical-to-physical mapping relationships).

Thus, while the current solution of the device-based FTL can isolate the FTL from the host, several challenges still remain.

FTL in System Memory in the Prior Art vs FTL in a RAM Block Device

Figures 2A, 2B:
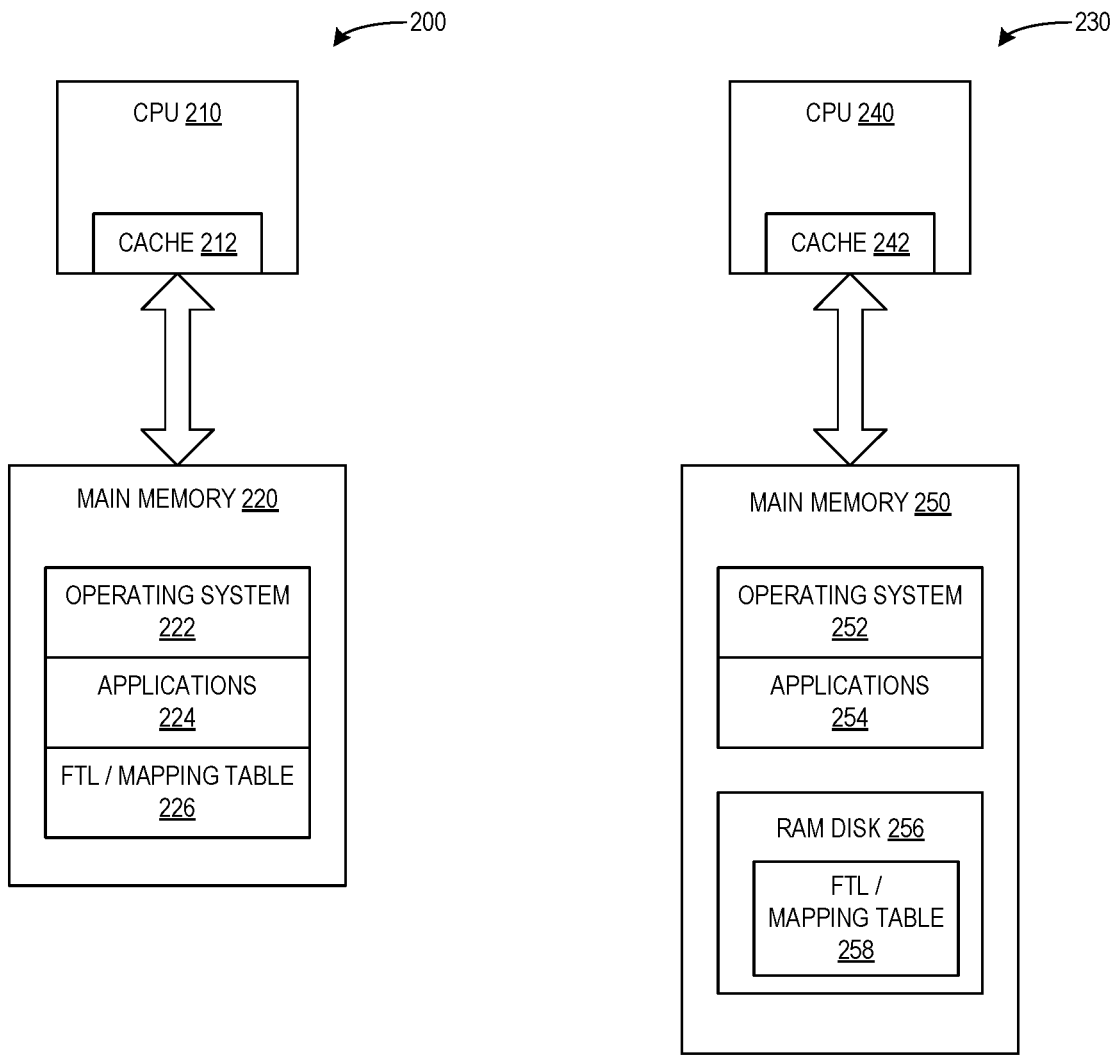
FIG. 2A illustrates an exemplary environment, where a flash translation layer runs in the system memory, in accordance with the prior art.
FIG. 2B illustrates an exemplary environment, where a flash translation layer runs in a RAM block device, in accordance with an embodiment of the present application.

FIG. 2A illustrates an exemplary environment 200, where a flash translation layer runs in the system memory, in accordance with the prior art. Environment 200 can include a CPU 210 with a cache 212. CPU 210 can communicate or be coupled to a main memory 220 (e.g., a DRAM DIMM), which can include: an operating system 222; applications 224; and an FTL/mapping table 226. In environment 200, FTL 226 can be a module or program which allocates memory and updates the mapping table in the allocated region. However, when FTL/mapping table 226 program crashes (e.g., a system crash or an application-related crash), the mapping table disappears or is no longer available. In order to recover from such a crash, the system must rebuild the mapping table in the time-consuming conventional manner, as described above in relation to FIG. 1.

FIG. 2B illustrates an exemplary environment 230, where a flash translation layer runs in a RAM block device 256, in accordance with an embodiment of the present application. Environment 230 can include a CPU 240 with a cache 242. CPU 240 can communicate or be coupled to a main memory 250 (e.g., a DRAM DIMM), which can include: an operating system 252; applications 254; and a RAM disk 256, which can store an FTL/mapping table 258. In environment 230, RAM disk 256 is a block device formed by the DRAM of the system memory (e.g., main memory 250). If the system experiences a crash associated with an application or with a driver which controls RAM disk 256, the system can quickly regain access to FTL/mapping table 258 by relaunching the FTL program, e.g., by making a system call to FTL program 258. Thus, the system can avoid the time-consuming process of reconstructing the mapping table(s) of FTL mapping file 258 stored in RAM disk 256.

Exemplary Access Hierarchy

Figure 3:
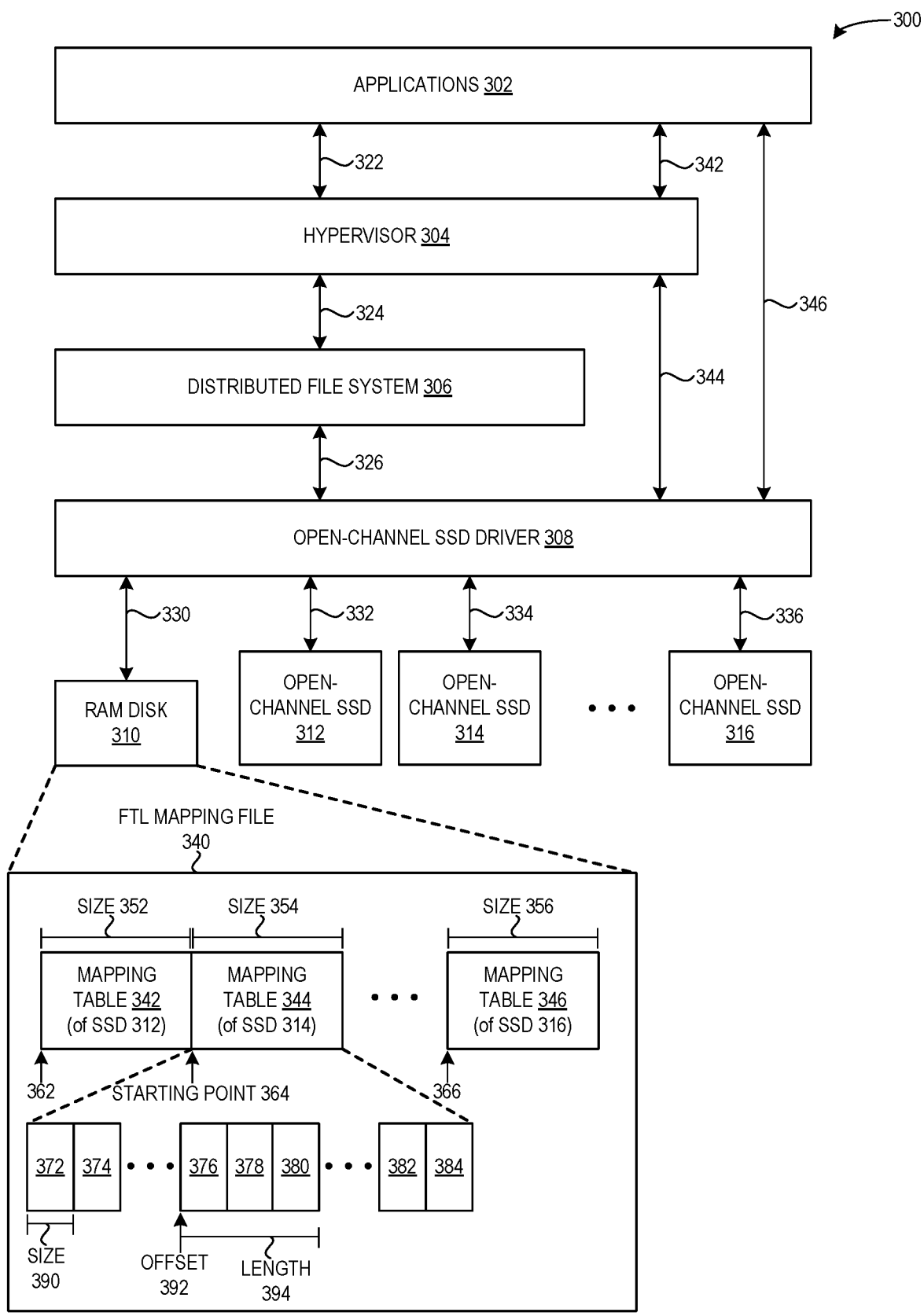
FIG. 3 illustrates an exemplary access hierarchy, in accordance with an embodiment of the present application.

FIG. 3 illustrates an exemplary access hierarchy 300, in accordance with an embodiment of the present application. Hierarchy 300 can include: applications 302; a hypervisor 304; a distributed file system 306; an open-channel SSD driver 308; a RAM disk 310; and open-channel SSDs 312, 314, and 316. During operation, applications 302 can communicate with or directly operate open-channel SSD driver 308 (via a communication 346). Applications 302 can also communicate with open-channel SSD driver 308 via hypervisor 304 (via a communication 324) for virtualization. Hypervisor 304 can communicate with or directly operate open-channel SSD driver 308 (via a communication 344) or can communicate with open-channel SSD driver 308 via distributed file system 306 (via communications 324 and 326).

Open-channel SSD driver 308 can communicate with RAM disk 310 (which can be a block device formed by system memory) (via a communication 330). Open-channel SSD driver 308 can also communicate with a plurality of open-channel SSD, e.g., open-channel SSDs 312, 314, and 316 (via, respectively, communications 332, 334, and 336).

RAM disk 310 can store FTL mapping file 340, which can include appended mapping tables 342, 344, and 346 associated with each of open channel SSDs 312-316, in an ordered sequence based on the same ordered sequence of the associated storage drives. The ordered sequence can be, e.g., as depicted from left to right, SSD 312, SSD 314, and SSD 316. Each individual mapping table can be stored as a single unit or chunk as part of FTL mapping file 340. Note that FTL mapping file 340 can be stored in RAM disk 310 separately from an FTL driver program of open-channel SSD driver 308, which can be stored in system memory.

The size of each mapping table can be based on the size or capacity of the corresponding storage drive or SSD. The size or capacity of each SSD may be different, and the size of the associated mapping tables may also be different. For example, given a ratio of 1000:1, if a capacity of SSD 312 is 4 Terabytes (TB), a size 352 of mapping table 342 (associated with SSD 312) can be 4 Gigabytes (GB). Similarly, if a capacity of SSD 314 is 2 TB, a size 354 of mapping table 344 (associated with SSD 314) can be 2 GB. In addition, if a capacity of SSD 316 is 8 TB, a size 356 of mapping table 346 (associated with SSD 316) can be 8 GB.

Each mapping table can be organized based on an ascending order of LBA values, where each LBA can correspond to metadata of a predetermined size for the mapping table. For example, the metadata may indicate information about the physical location (including, e.g., a physical block address (PBA)) of where data corresponding to a given LBA value is stored, and the metadata itself as stored in the mapping table may be of a fixed size, e.g., 10 bytes. Using this fixed-size for the metadata, in a given mapping table, with LBA values in an ascending order (e.g., {LBA_1, LBA_2, LBA_3, . . . LBA_n}: LBA_1 may correspond to bytes 1 through 10; LBA_2 may correspond to bytes 11 through 20; LBA_3 may correspond to bytes 21 through 30; and LBA_n may correspond to bytes ((n*10)−9) through (n*10). This allows the system to utilize the known data format and size of data stored on the block device (i.e., in each mapping table) to build the addressing. That is, the system can build the mapping tables and the address information based on the data structure of the mapping tables, without requiring a complex content management layer such as a file system. An exemplary content management layer which communicates with the driver and the block device is described below in relation to FIG. 5.

Thus, based on the ascending order of the LBA values in a given mapping table and based on the known or predetermined size of metadata stored in the given mapping table, the system can determine an offset and a length. The system can determine the offset based on a value of an LBA associated with an incoming I/O request (or with the first LBA of one or more LBAs associated with an incoming I/O request). The system can determine the length based on a number of the one or more LBAs associated with the incoming I/O request and the predetermined or fixed size of metadata stored in the given mapping table (e.g., length=number of LBAs*fixed size of metadata for the given mapping table).

Furthermore, the system can determine a starting point for each mapping table based on the cumulative sizes of the preceding mapping tables, where the preceding mapping tables are determined based on the ordered sequence. That is, the system can identify a starting point for a given mapping table associated with a given storage drive based on a summation of the sizes of mapping tables associated with storage drives which precede the given mapping table in the sequence.

A starting point 362 of mapping table 342 can have a value of zero, as mapping table 342 is the first table in the appended plurality of corresponding mapping tables in FTL mapping file 340. A starting point 364 of mapping table 344 can have a value equal to the sum of the sizes of the preceding mapping tables, i.e., a value of length or size 352 of preceding mapping table 342. A starting point 366 of mapping table 346 can have a value equal to the sum of the sizes of the preceding mapping tables, i.e., a value equal to at least size 352 of preceding mapping table 342 plus size 354 of preceding mapping table 344 (plus the sizes of any other preceding mapping tables subsequent to mapping table 344 and prior to mapping table 346, not shown).

Furthermore, when processing an incoming I/O request, the system can determine an offset and a length associated with the I/O request, and access a physical location or physical block address in the given storage drive by starting at the identified starting point plus the offset for a number of units (e.g., bytes) equal to the length. For example, assume that LBA_e corresponds to or is mapped to metadata 376, LBA_f corresponds to or is mapped to metadata 378, and LBA_g corresponds to or is mapped to metadata 380. While processing an I/O request for data associated with logical block addresses LBA_e, LBA_f, and LBA_g ("the three incoming LBAs"), open-channel SSD driver 308 can receive the I/O request and determine that SSD 314 is the storage device to be accessed. Driver 308 can access RAM disk 310 to retrieve from mapping table 344 (associated with SSD 314) the physical location associated with the incoming LBAs. The system can identify starting point 364 for mapping table 344 (as described above), and can determine an offset 392 (determined based on the value of LBA_e, the first of the three incoming LBAs, as corresponding to metadata 376). The system can start reading data from starting point 364 plus offset 392, for a length 394 (determined based on the number (three) of LBAs of the incoming LBAs multiplied by the fixed size of metadata for mapping table 344).

Thus, hierarchy 300 depicts both the hierarchy of communications in the described embodiments, as well as the manner of accessing a given mapping table stored in the FTL mapping file as part of a plurality of ordered and appended mapping tables associated with an ordered sequence of the storage drives.

Figures 4A, 4B:
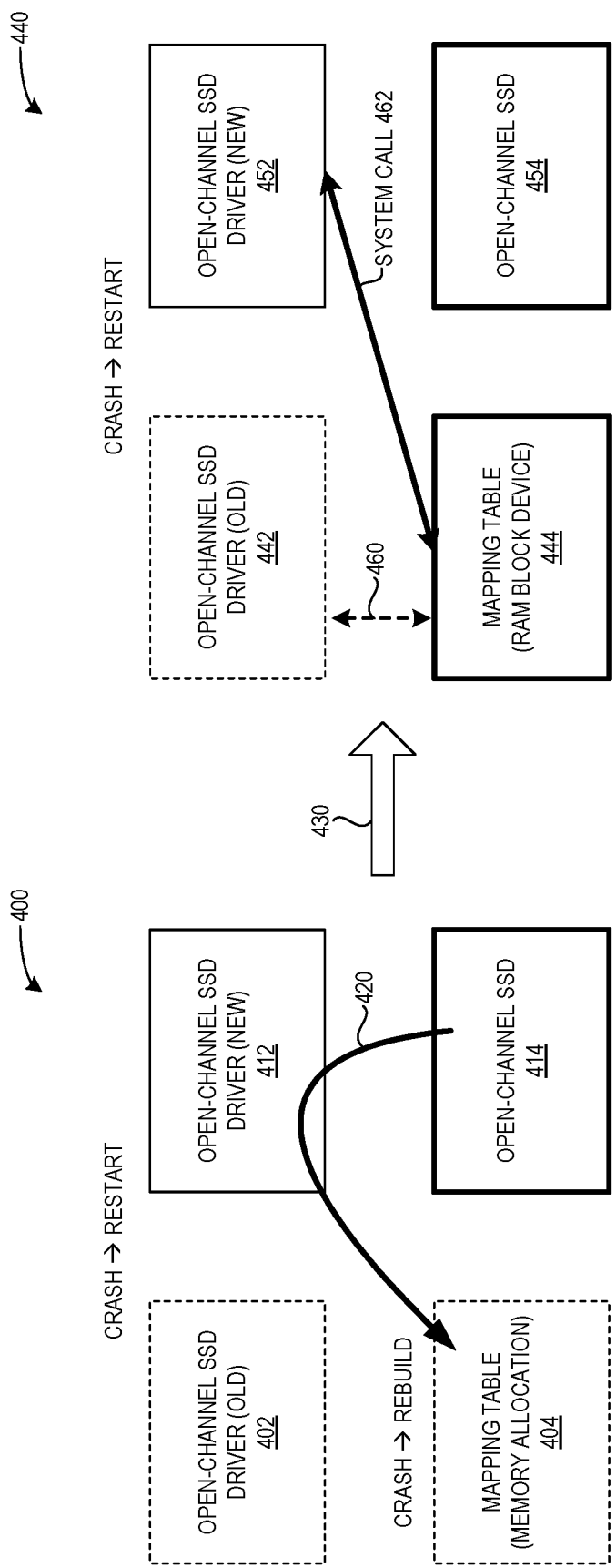
FIG. 4A illustrates diagram of a recovery procedure subsequent to a host-FTL crash, including a mapping table reconstruction, in accordance with the prior art.
FIG. 4B illustrates a diagram of a recovery procedure subsequent to a host-FTL crash, in accordance with an embodiment of the present application.

Mapping Table Reconstruction in the Prior Art vs. Fast Recovery From Crash Using Block Device FIG. 4A illustrates diagram 400 of a recovery procedure subsequent to a host-FTL crash, including a mapping table reconstruction, in accordance with the prior art. In diagram 400, when the system experiences a crash (e.g., a host-side FTL crash) associated with an open-channel SSD driver (old) 402, the system must restart the FTL program (as indicated by "CRASH→RESTART"). An open-channel SSD driver (new) 412 must re-allocate memory and load data from an open-channel SSD 414 (via a communication 420) in order to rebuild a mapping table (memory allocation) 404 (as indicated by "CRASH→REBUILD"). As described above, rebuilding or reconstructing the mapping table in this manner can require a time-consuming process which may not sufficiently meet the terms of an SLA.

FIG. 4B illustrates a diagram 440 of a recovery procedure subsequent to a host-FTL crash, in accordance with an embodiment of the present application. In diagram 440, when the system experiences a crash (e.g., a host-side FTL crash) associated with an open-channel SSD driver (old) 442, the system need only relaunch or restart the FTL program (as indicated by "CRASH→RESTART"). Instead of reallocating memory and loading data from an open-channel SSD 454 in order to rebuild or reconstruct the mapping table (as in prior art diagram 400 of FIG. 4A), an open-channel SSD driver (new) 452 need only make a system call 462 to access a mapping table 444 (as stored in RAM block device 444). As a result, the system essentially loses only a communication 460 between open-channel SSD driver (old) 442, and does not need to communicate with SSD 454 at all in order to rebuild or reconstruct the mapping table (as indicated by the absence of a label for "CRASH→REBUILD" in FIG. 4B). Note that the FTL mapping table stored in RAM block device 444 can be stored separately from, rather than together with, an FTL driver program of the SSD driver or block device driver (442 or 452), which can be stored in system memory. Thus, the system can eliminate the need to rebuild or reconstruct the mapping table, as the mapping table remains unaffected, stored, and quickly accessible via system call 462, based on its placement in RAM block device 444, which can facilitate a fast crash recovery.

In this manner, the system of FIG. 4B can avoid, eliminate, or be absent of the reconstruction of the mapping table (as indicated by an improvement 430 over the prior art environment of diagram 400), thus eliminating the need for a time-consuming process which may not sufficiently meet the terms of an SLA.

The described embodiments provide a solution and improvement to the scenario in which the host-side FTL crashes (as in an open-channel SSD). In the infrequent event of the entire server experiencing a crash (such as during a power cycle), the entire server will require time to properly restart. Because the FTL mapping file is stored in the block device which is a RAM disk and running on the volatile system memory, the system can rebuild the mapping tables as needed during the time required for the whole server to restart. That is, the embodiments described herein are directed to the situation in which the FTL program, the FTL mapping file of the block device, or the associated block device driver experiences a crash, and to the improvements thereon.

Content Management Module For Dynamic Granularity Access

Figure 5:
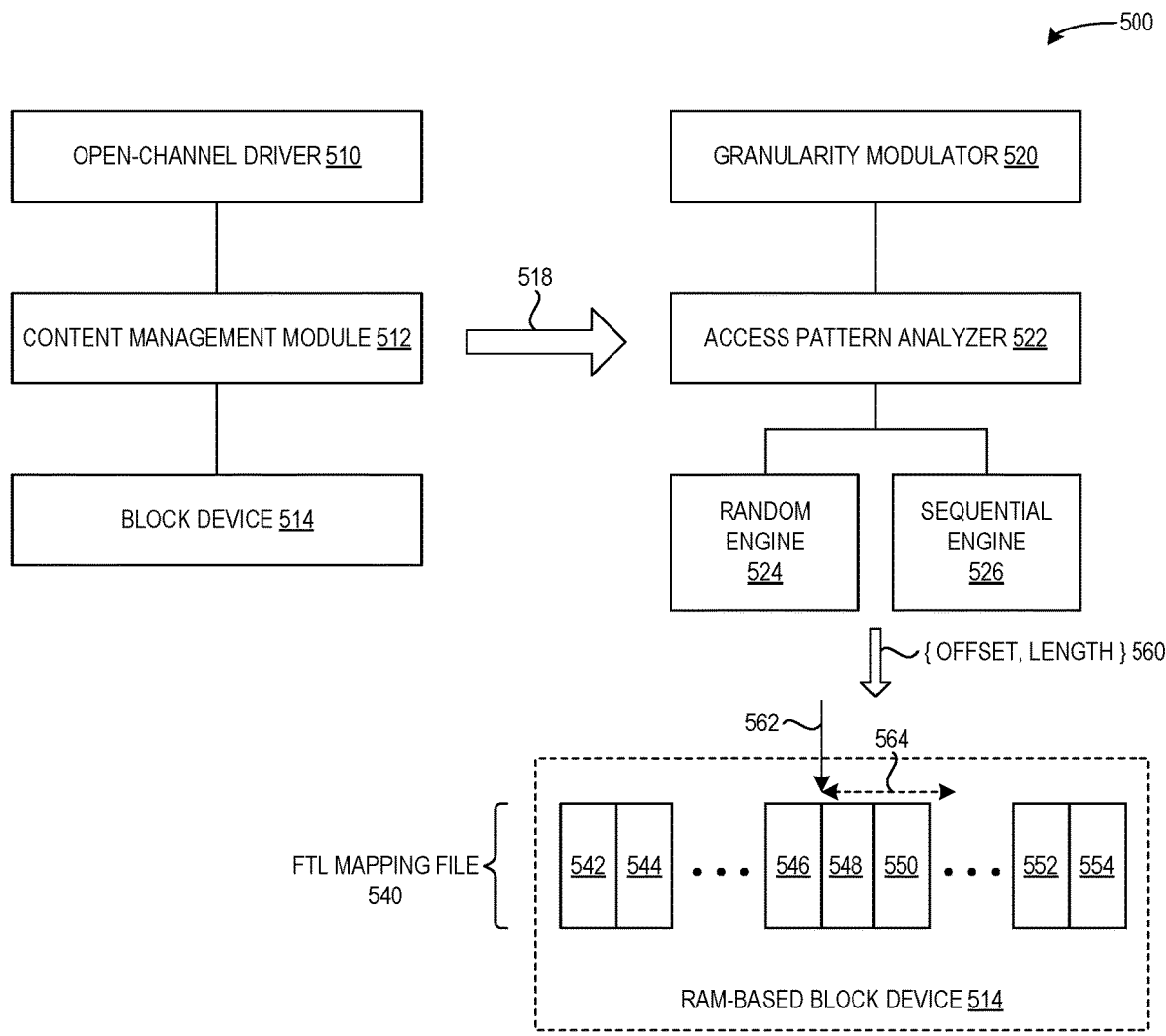
FIG. 5 illustrates an environment with a content management module which provides a dynamic access granularity, in accordance with an embodiment of the present application.

FIG. 5 illustrates an environment 500 with a content management module 512 which provides a dynamic access granularity, in accordance with an embodiment of the present application. In environment 500, an open-channel driver 510 communicates with a block device 514 via content management module 512. Content management module 512 can include: a granularity modulator 520, which adjusts a size of a unit of data to access in the FTL mapping file stored in block device 514; an access pattern analyzer 522, which determines an access pattern for a given or requested data or corresponding metadata; a random engine 524; and a sequential engine 526. Block device 514 can store an FTL mapping file 540, which can include metadata of mapping tables associated with one or more storage drives. For example, FTL mapping file 540 can include metadata corresponding to LBAs which are sequentially ordered based on an ascending order of LBA values, such as metadata 542, 544, 546, 548, 550, 552, and 554.

The system can determine whether an I/O request is associated with a random read/write operation or a sequential read/write operation. The system can use random engine 524 responsive to determining a random read or write operation. Random engine 524 can access FTL mapping file 540 of block device 514 based on a granularity of a first size (e.g., a small size). Random engine 524 can also include a read cache (not shown) to increase the hit rate of data and to reduce the number of queries to block device 514. The system can use sequential engine 526 responsive to determining a sequential read or write operation, e.g., by predicting a relatively larger I/O size for which to pre-fetch mapping information (e.g., metadata or physical location information) corresponding to one or more incoming LBAs. Sequential engine 526 can access FTL mapping file 540 of block device 514 based on a granularity of a second size (e.g., a large size, or a size greater than the first size).

As described above, when processing an I/O request and accessing FTL mapping file 540 stored in block device 514, the system can determine a starting point of a given mapping table in FTL mapping file 540 (as described above not shown in FIG. 5). The system can also determine an {offset, length} 560 associated with incoming I/O data. The system can retrieve data starting from a location 562 (which can include the starting point plus offset 560) for a number of units equal to a length 560 (indicated as a size or a length 564 in FTL mapping file 540). In some embodiments, offset 560 can include the starting point, where the system determines a single offset by first identifying the starting point of the given mapping table and moving to the correct location in the given mapping table based on the offset determined by the specific LBA value (or the first specific LBA value of a plurality of LBA values).

Method For Facilitating Recovery of Data

Figure 6:
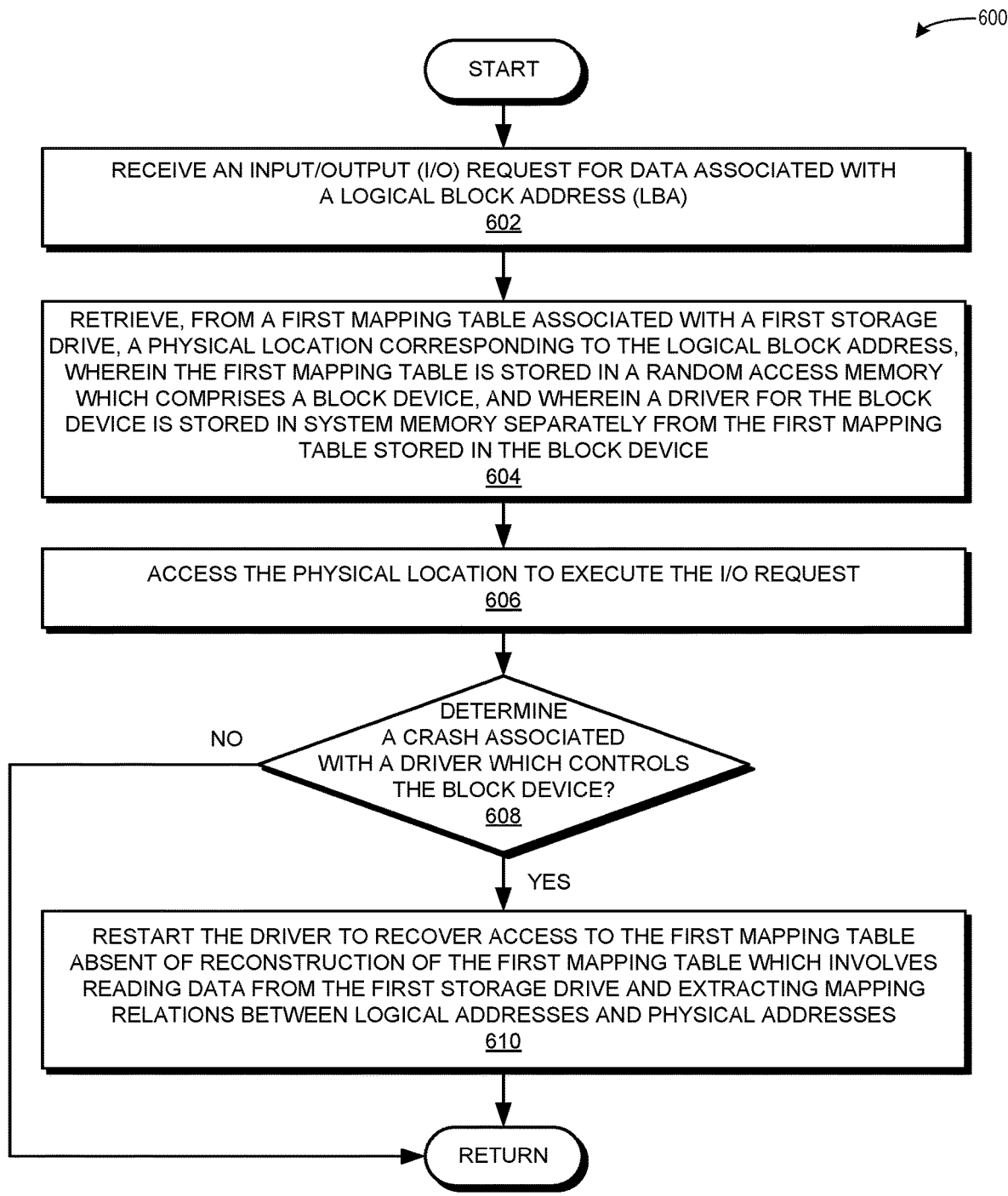
FIG. 6 presents a flowchart illustrating a method for facilitating recovery subsequent to a crash, in accordance with an embodiment of the present application.

FIG. 6 presents a flowchart 600 illustrating a method for facilitating recovery subsequent to a crash, in accordance with an embodiment of the present application. During operation, the system receives an input/output (I/O) request for data associated with a logical block address (operation 602). The system retrieves, from a first mapping table associated with a first storage drive, a physical location corresponding to the logical block address, wherein the first mapping table is stored in a random access memory (RAM) which comprises a block device, and wherein a driver for the block device is stored in system memory separately from the first mapping table stored in the block device (operation 604). The system accesses the physical location to execute the I/O request (operation 606). If the system does not determine a crash associated with a driver which controls (or for) the block device (decision 608), the operation returns.

If the system does determine a crash associated with a driver which controls (or for) the block device (decision 608), the system restarts the driver to recover access to the first mapping table absent of reconstruction of the first mapping table which involves reading data from the first storage drive and extracting mapping relations between logical addresses and physical addresses (operation 610). The operation returns.

Figure 7A:
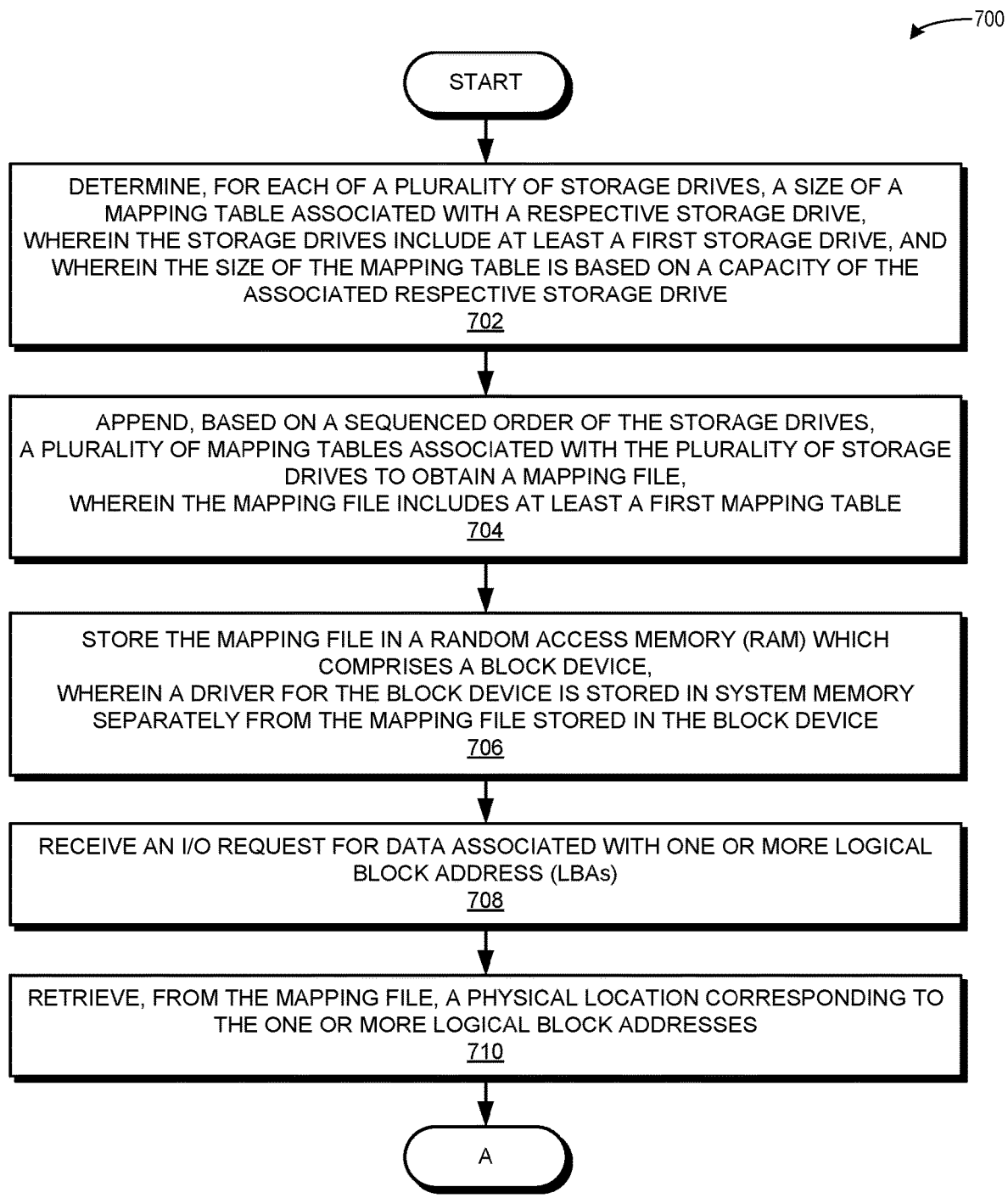
FIG. 7A presents a flowchart illustrating a method for facilitating management and access of a mapping file, in accordance with an embodiment of the present application.

Method For Facilitating Management of Mapping Files and Dynamic Access Granularity FIG. 7A presents a flowchart 700 illustrating a method for facilitating management and access of a mapping file, in accordance with an embodiment of the present application. During operation, the system determines, for each of a plurality of storage drives, a size of a mapping table associated with a respective storage drive, wherein the storage drives include at least a first storage drive, and wherein the size of the mapping table is based on a capacity of the associated respective storage drive (operation 702). The system appends, based on a sequenced order of the storage drives, a plurality of mapping tables associated with the plurality of storage drives to obtain a mapping file, wherein the mapping file includes at least a first mapping table (operation 704). The system stores the mapping file in a random access memory (RAM) which comprises a block device, wherein a driver for the block device is stored in a system memory separately from the mapping file stored in the block device (operation 706). The system receives an I/O request for data associated with one or more logical block addresses (operation 708). The system retrieves, from the mapping file, a physical location corresponding to the one or more logical block addresses (operation 710). The operation continues at Label A of FIG. 7B.

Figure 7B:
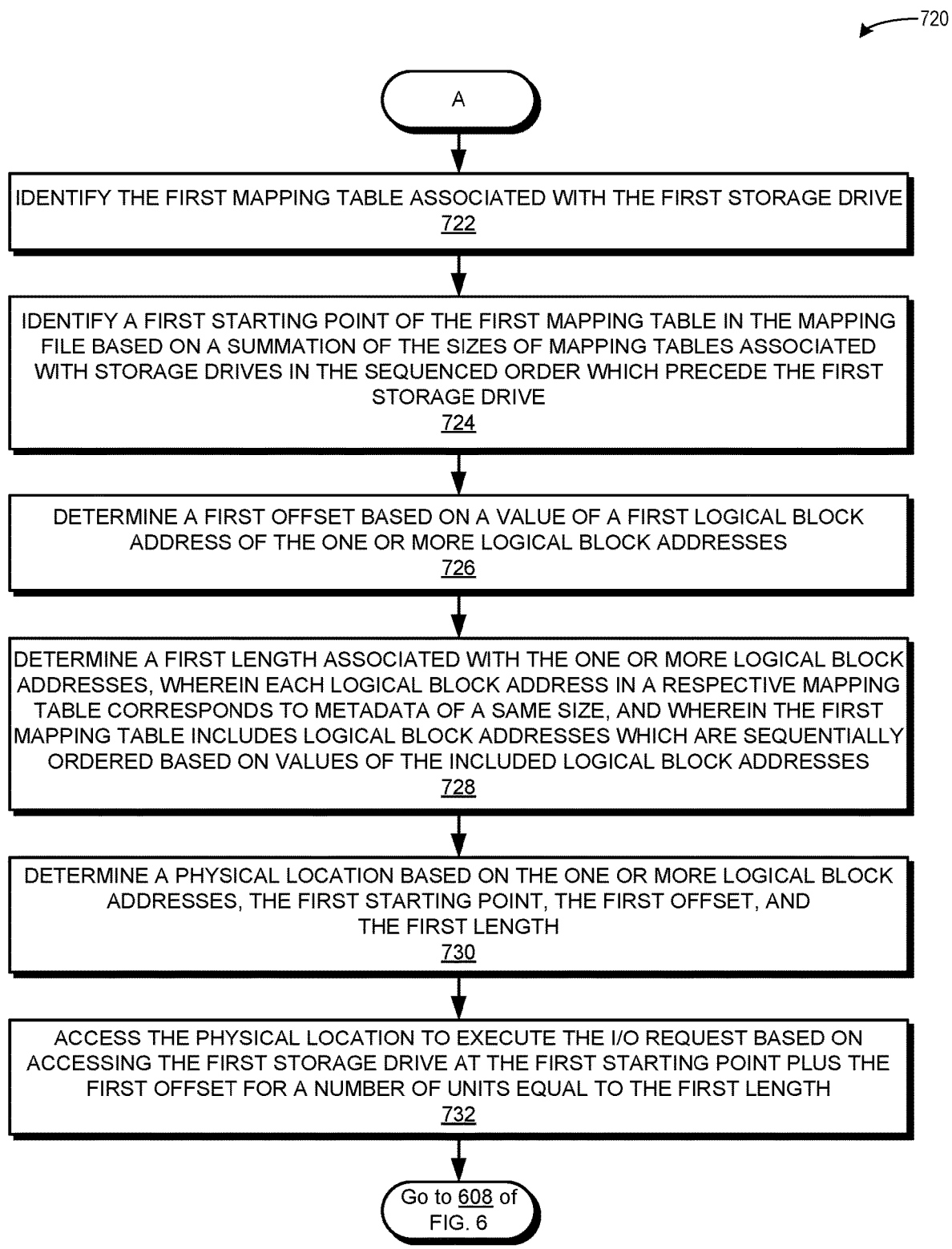
FIG. 7B presents a flowchart illustrating a method for facilitating management and access of a mapping file, in accordance with an embodiment of the present application.

FIG. 7B presents a flowchart 720 illustrating a method for facilitating management and access of a mapping file, in accordance with an embodiment of the present application. The system identifies the first mapping table associated with the first storage drive (operation 722). The system identifies a first starting point of the first mapping table based on a summation of the sizes of mapping tables associated with storage drives in the sequenced order which precede the first storage drive (operation 724). The system determines a first offset based on a value of a first logical block address of the one or more logical block addresses (operation 726). This "first" LBA is the first LBA value which occurs in an ordered sequence of the one or more LBAs. The system determines a first length associated with the one or more logical block addresses, wherein each logical block address in a respective mapping table corresponds to metadata of a same size, and wherein the first mapping table includes logical block addresses which are sequentially ordered based on values of the included logical block addresses (operation 728).

The system determines a physical location based on the one or more logical block addresses, the first starting point, the first offset, and the first length (operation 730). The system accesses the physical location to execute the I/O request based on accessing the first storage drive at the first starting point plus the first offset for a number of units equal to the first length (operation 732). The first length can be equal to a number of the one or more logical block addresses scaled by a predetermined size of metadata stored in the first mapping table. The operation continues at operation 608 of FIG. 6.

Determining and accessing the physical location may involve one or more of an access pattern analyzer, a granularity modulator, a random engine, and a sequential engine, as described above in relation to FIG. 5.

Exemplary Computer System and Apparatus

Figure 8:
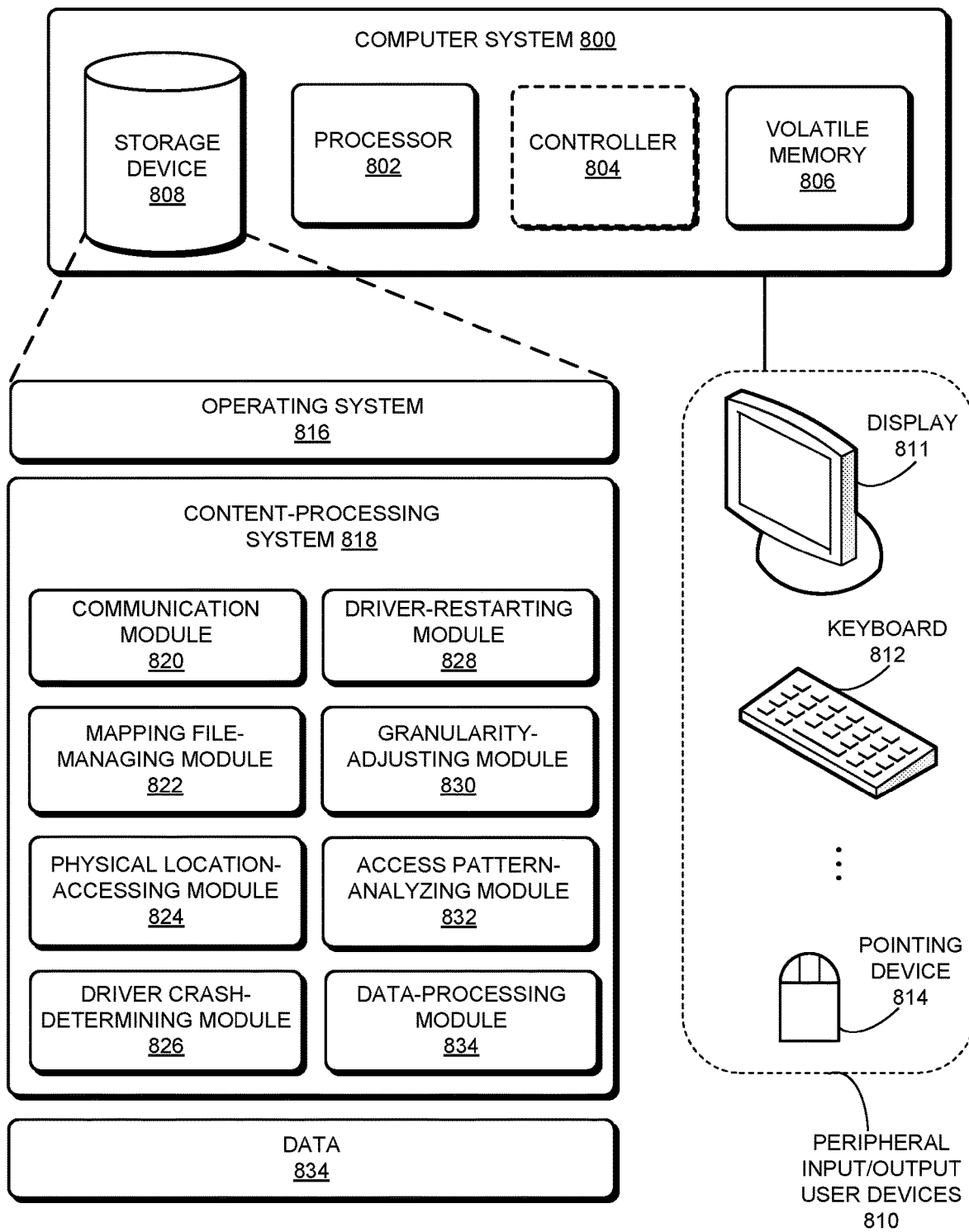
FIG. 8 illustrates an exemplary computer system that facilitates recovery, in accordance with an embodiment of the present application.

FIG. 8 illustrates an exemplary computer system that facilitates recovery, in accordance with an embodiment of the present application. Computer system 800 includes a processor 802, a volatile memory 806, and a storage device

808. In some embodiments, computer system 800 can include a controller 804 (indicated by the dashed lines). Volatile memory 806 can include, e.g., random access memory (RAM), that serves as a managed memory. Volatile memory 806 can be used to store one or more memory pools and to form a block device. Storage device 808 can include persistent storage which can be managed or accessed via processor 802 (or controller 804). Furthermore, computer system 800 can be coupled to peripheral input/output (I/O) user devices 810, e.g., a display device 811, a keyboard 812, and a pointing device 814. Storage device 808 can store an operating system 816, a content-processing system 818, and data 836.

Content-processing system 818 can include instructions, which when executed by computer system 800, can cause computer system 800 or processor 802 to perform methods and/or processes described in this disclosure. Specifically, content-processing system 818 can include instructions for receiving and transmitting data packets, including data to be read or written, an input/output (I/O) request (e.g., a read request or a write request), metadata, a logical block address (LBA), and a physical block address (PBA) or a physical location (communication module 820).

Content-processing system 818 can further include instructions for receiving an input/output (I/O) request for data associated with a logical block address (communication module 820). Content-processing system 818 can include instructions for retrieving, from a first mapping table associated with a first storage drive, a physical location corresponding to the logical block address, wherein the first mapping table is stored in a random access memory (RAM) which comprises a block device, and wherein a driver for the block device is stored in system memory separately from the first mapping table stored in the block device (mapping file-managing module 822). Content-processing system 818 can also include instructions for accessing the physical location to execute the I/O request (physical location-accessing module 824). Content-processing system 818 can include instructions for, responsive to determining a crash associated with a driver which controls the block device (driver-crash determining module 826), restarting the driver to recover access to the first mapping table absent of reconstruction of the first mapping table which involves reading data from the first storage drive and extracting mapping relations between logical addresses and physical addresses (driver-restarting module).

Content-processing system 818 can additionally include instructions for determining sizes of mapping tables, appending mapping tables associated with storages drives to obtain a mapping file, and storing the mapping file in a block device (mapping file-managing module 822). Content-processing system 818 can include instructions for retrieving the physical location by identifying a starting point and determining an offset and a length (physical location-accessing module 824).

Content-processing system 818 can also include instructions for determining an access pattern for the requested I/O data (access pattern-analyzing module 832). Content-processing system 818 can include instructions for adjusting a size of a unit to access (granularity-adjusting module 830). Content-processing system 818 can include instructions for determining whether an I/O request is associated with a random read/write operation or a sequential read/write operation (data-processing module 834). Content-processing system 818 can further include instructions for, responsive to determining a random read or write operation (data-processing module 834), accessing, by the random engine, the mapping file of the block device with a granularity of a first size, wherein the random engine includes a read cache (mapping file-managing module 822). Content-processing system 818 can include instructions for, responsive to determining a sequential read or write operation (data-processing module 834), accessing, by the sequential engine, the mapping file of the block device with a granularity of a second size which is greater than the first size (mapping file-managing module 822).

Data 836 can include any data that is required as input or generated as output by the methods and/or processes described in this disclosure. Specifically, data 836 can store at least: data; an I/O request; metadata; data associated with a logical block address (LBA); a logical block address (LBA); a physical block address (PBA); a physical location; a mapping table; a mapping file or an FTL mapping file; a logical-to-physical mapping; an identifier or indicator of storage drive or an associated mapping table; an order; a sequential, ascending, or sequenced order; a starting point; an offset; a length; a size; a number of units; a number of LBAs; an identifier or indicator of a content management module, an access pattern analyzer, a granularity modulator, a random engine, or a sequential engine; an identifier or indicator of an application, a driver, a hypervisor, a distributed file system, or a block device; a flash translation layer program and related information; and a system call to restart a driver.

Figure 9:
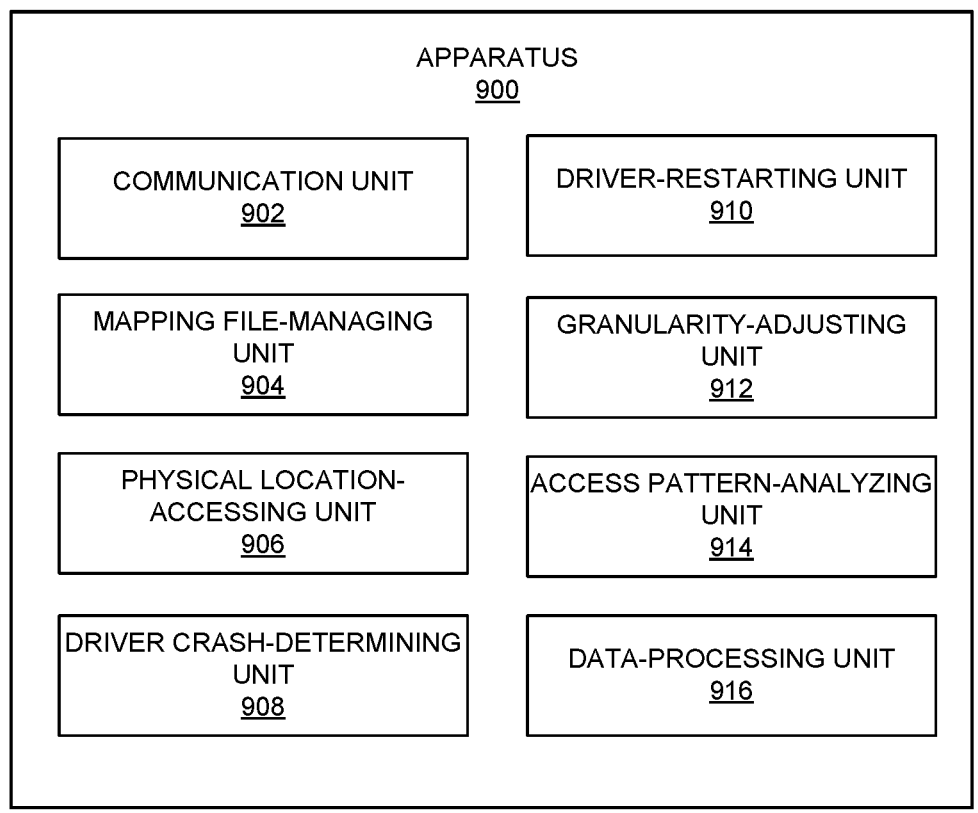
FIG. 9 illustrates an exemplary apparatus that facilitates recovery, in accordance with an embodiment of the present application.

FIG. 9 illustrates an exemplary apparatus 900 that facilitates recovery, in accordance with an embodiment of the present application. Apparatus 900 can comprise a plurality of units or apparatuses which may communicate with one another via a wired, wireless, quantum light, or electrical communication channel. Apparatus 900 may be realized using one or more integrated circuits, and may include fewer or more units or apparatuses than those shown in FIG. 9. Furthermore, apparatus 900 may be integrated in a computer system, or realized as a separate device or devices capable of communicating with other computer systems and/or devices.

Apparatus 900 can comprise modules or units 902-916 which are configured to perform functions or operations similar to modules 820-834 of computer system 800 of FIG. 8, including: a communication unit 902; a mapping file-managing unit 904; a physical location-accessing unit 906; a driver crash-determining unit 908; a driver-restarting unit 910; a granularity-adjusting unit 912; an access pattern-analyzing unit 914; and a data-processing unit 916.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing embodiments described herein have been presented for purposes of illustration and description only. They are not intended to be exhaustive or to limit the embodiments described herein to the forms disclosed. Accordingly, many modifications and variations will be apparent to practitioners skilled in the art. Additionally, the above disclosure is not intended to limit the embodiments described herein. The scope of the embodiments described herein is defined by the appended claims.

What is claimed is:

1. A computer-implemented method, comprising:
receiving an input/output (I/O) request for data associated with a logical block address;
retrieving, from a first mapping table associated with a first storage drive, a physical location corresponding to the logical block address,
wherein the first mapping table is stored in a random access memory (RAM) which comprises a block device, and
wherein a driver for the block device is stored in system memory separately from the first mapping table stored in the block device;
accessing the physical location to execute the I/O request;
determining, for each of the plurality of storage drives, a size of a mapping table associated with a respective storage drive; and
appending, based on a sequenced order of the storage drives, a plurality of mapping tables associated with the plurality of storage drives to obtain a mapping file.

2. The method of claim 1,
wherein the size of the mapping table is based on a capacity of the associated respective storage drive;
wherein the mapping file includes the first mapping table; and
wherein the method further comprises storing the mapping file in the block device.

3. The method of claim 1, wherein the I/O request for data is associated with one or more logical block addresses which include the logical block address, and wherein the method further comprises retrieving the physical location corresponding to the one or more logical block addresses by:
identifying the first mapping table associated with the first storage drive;
identifying a first starting point of the first mapping table based on a summation of the sizes of mapping tables associated with storage drives in the sequenced order which precede the first storage drive;
determining a first offset based on a value of a first logical block address of the one or more logical block addresses; and
determining a first length associated with the one or more logical block addresses, wherein each logical block address in a respective mapping table corresponds to metadata of a same size, and wherein the first mapping table includes logical block addresses which are sequentially ordered based on values of the included logical block addresses, and
wherein accessing the physical location to execute the I/O request is based on accessing the first storage drive at the first starting point plus the first offset for a number of units equal to the first length.

4. The method of claim 3,
wherein the first length is equal to a number of the one or more logical block addresses scaled by a predetermined size for metadata stored in the first mapping table.

5. The method of claim 1,
wherein a content management module communicates with the driver and the block device to manage the mapping file which includes the appended mapping tables associated with the plurality of storage drives, and
wherein the content management module comprises a granularity modulator, an access pattern analyzer, a random engine, and a sequential engine.

6. The method of claim 5, further comprising:
determining, by the access pattern analyzer, an access pattern for the requested I/O data;
adjusting, by the granularity modulator, a size of a unit to access; and
determining whether the I/O request is associated with a random read/write operation or a sequential read/write operation.

7. The method of claim 6, further comprising:
responsive to determining a random read or write operation, accessing, by the random engine, the mapping file of the block device with a granularity of a first size, wherein the random engine includes a read cache; and
responsive to determining a sequential read or write operation, accessing, by the sequential engine, the mapping file of the block device with a granularity of a second size which is greater than the first size,
wherein the second size is determined based on a prediction of how much data to pre-fetch from the mapping file of the block device.

8. The method of claim 1,
wherein the driver communicates with the block device and the plurality of storage drives,
wherein an application communicates with the driver based on one or more of:
a communication between the application and the driver; and
a communication between the application and the driver via a hypervisor,
wherein the hypervisor communicates with the driver based on one or more of:
a communication between the hypervisor and the driver; and
a communication between the hypervisor and the driver via a distributed file system.

9. The method of claim 1, further comprising:
responsive to determining a crash associated with the driver for the block device, restarting the driver to recover access to the first mapping table absent of reconstruction of the first mapping table which involves reading data from the first storage drive and extracting mapping relations between logical addresses and physical addresses,
wherein a flash translation layer program running in the driver manages the first mapping table,
wherein determining the crash associated with the driver comprises determining a crash associated with the flash translation layer program, and
wherein restarting the driver comprises relaunching the flash translation layer program to recover access to the first mapping table.

10. A computer system, comprising:
a processor; and
a memory coupled to the processor and storing instructions which, when executed by the processor, cause the processor to perform a method, the method comprising:
receiving an input/output (I/O) request for data associated with a logical block address;
retrieving, from a first mapping table associated with a first storage drive, a physical location corresponding to the logical block address,
wherein the first mapping table is stored in a random access memory (RAM) which comprises a block device,
wherein a driver for the block device is stored in system memory separately from the first mapping table stored in the block device;
accessing the physical location to execute the I/O request;
determining, for each of the plurality of storage drives, a size of a mapping table associated with a respective storage drive; and
appending, based on a sequenced order of the storage drives, a plurality of mapping tables associated with the plurality of storage drives to obtain a mapping file.

11. The computer system of claim 10,
wherein the size of the mapping table is based on a capacity of the associated respective storage drive;
wherein the mapping file includes the first mapping table; and
wherein the method further comprises storing the mapping file in the block device.

12. The computer system of claim 10, wherein the I/O request for data is associated with one or more logical block addresses which include the logical block address, and wherein the method further comprises retrieving the physical location corresponding to the one or more logical block addresses by:
identifying the first mapping table associated with the first storage drive;
identifying a first starting point of the first mapping table based on a summation of the sizes of mapping tables associated with storage drives in the sequenced order which precede the first storage drive;
determining a first offset based on a value of a first logical block address of the one or more logical block addresses; and
determining a first length associated with the one or more logical block addresses, wherein each logical block address in a respective mapping table corresponds to metadata of a same size, and wherein the first mapping table includes logical block addresses which are sequentially ordered based on values of the included logical block addresses, and
wherein accessing the physical location to execute the I/O request is based on accessing the first storage drive at the first starting point plus the first offset for a number of units equal to the first length.

13. The computer system of claim 12,
wherein the first length is equal to a number of the one or more logical block addresses scaled by a predetermined size for metadata stored in the first mapping table.

14. The computer system of claim 10,
wherein a content management module communicates with the driver and the block device to manage the mapping file which includes the appended mapping tables associated with the plurality of storage drives, and
wherein the content management module comprises a granularity modulator, an access pattern analyzer, a random engine, and a sequential engine.

15. The computer system of claim 14, wherein the method further comprises:
determining, by the access pattern analyzer, an access pattern for the requested I/O data;
adjusting, by the granularity modulator, a size of a unit to access; and
determining whether the I/O request is associated with a random read/write operation or a sequential read/write operation.

16. The computer system of claim 15, wherein the method further comprises:
responsive to determining a random read or write operation, accessing, by the random engine, the mapping file of the block device with a granularity of a first size, wherein the random engine includes a read cache; and
responsive to determining a sequential read or write operation, accessing, by the sequential engine, the mapping file of the block device with a granularity of a second size which is greater than the first size,
wherein the second size is determined based on a prediction of how much data to pre-fetch from the mapping file of the block device.

17. The computer system of claim 10,
wherein the driver communicates with the block device and the plurality of storage drives,
wherein an application communicates with the driver based on one or more of:
a communication between the application and the driver; and
a communication between the application and the driver via a hypervisor,
wherein the hypervisor communicates with the driver based on one or more of:
a communication between the hypervisor and the driver; and
a communication between the hypervisor and the driver via a distributed file system.

18. The computer system of claim 10, wherein the method further comprises:
responsive to determining a crash associated with the driver for the block device, restarting the driver to recover access to the first mapping table absent of reconstruction of the first mapping table which involves reading data from the first storage drive and extracting mapping relations between logical addresses and physical addresses,
wherein a flash translation layer program running in the driver manages the first mapping table,
wherein determining the crash associated with the driver comprises determining a crash associated with the flash translation layer program, and
wherein restarting the driver comprises relaunching the flash translation layer program to recover access to the first mapping table.

19. A non-transitory computer-readable storage medium storing instructions that when executed by a computer cause the computer to perform a method, the method comprising:
receiving an input/output (I/O) request for data associated with a logical block address;
retrieving, from a first mapping table associated with a first storage drive, a physical location corresponding to the logical block address, wherein the first mapping table is stored in a random access memory (RAM) which comprises a block device, and wherein a driver for the block device is stored in system memory separately from the first mapping table stored in the block device;

accessing the physical location to execute the I/O request;

responsive to determining a crash associated with the driver for the block device, restarting the driver to recover access to the first mapping table absent of reconstruction of the first mapping table which involves reading data from the first storage drive and extracting mapping relations between logical addresses and physical addresses.

20. The non-transitory computer-readable storage medium of claim 19, wherein the method further comprises:
   determining the crash associated with the driver for the block device;
   wherein a flash translation layer program running in the driver manages the first mapping table,
   wherein determining the crash associated with the driver comprises determining a crash associated with the flash translation layer program, and
   wherein restarting the driver comprises relaunching the flash translation layer program to recover access to the first mapping table.

21. A computer-implemented method, comprising:

determining a first mapping table associated with a first storage drive, wherein the first mapping table is stored in a random access memory (RAM) which comprises a block device, and wherein a driver for the block device is stored in system memory separately from the first mapping table stored in the block device; and responsive to determining a crash associated with the driver for the block device, restarting the driver to recover access to the first mapping table absent of reconstruction of the first mapping table which involves reading data from the first storage drive and extracting mapping relations between logical addresses and physical addresses.

\* \* \* \* \*